(12) United States Patent
Sepulveda et al.

(10) Patent No.: US 9,524,573 B2
(45) Date of Patent: Dec. 20, 2016

(54) SYSTEMS, METHODS, AND COMPUTER-READABLE MEDIA FOR MANIPULATING AND MAPPING TILES OF GRAPHICAL OBJECT DATA

(75) Inventors: Raymond S. Sepulveda, Cupertino, CA (US); Angela J. Guzman Suarez, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 989 days.

(21) Appl. No.: 13/359,014

(22) Filed: Jan. 26, 2012

(65) Prior Publication Data

US 2012/0306914 A1 Dec. 6, 2012

Related U.S. Application Data

(60) Provisional application No. 61/493,509, filed on Jun. 5, 2011.

(51) Int. Cl.
*G09G 5/377* (2006.01)
*G06T 11/60* (2006.01)
*G06T 15/50* (2011.01)

(52) U.S. Cl.
CPC .............. *G06T 11/60* (2013.01); *G06T 15/50* (2013.01)

(58) Field of Classification Search
None
See application file for complete search history.

(56) References Cited

U.S. PATENT DOCUMENTS

| | | | |
|---|---|---|---|
| 6,289,364 B1* | 9/2001 | Borg et al. ................ | 715/209 |
| 6,317,142 B1* | 11/2001 | Decoste et al. ............ | 715/762 |
| 7,047,014 B1* | 5/2006 | Friday et al. .............. | 455/446 |
| 7,667,717 B2* | 2/2010 | Baudisch ................... | 345/639 |
| 2004/0042662 A1* | 3/2004 | Wilensky et al. .......... | 382/194 |
| 2004/0194020 A1* | 9/2004 | Beda et al. ................ | 715/502 |
| 2005/0099434 A1* | 5/2005 | Gray et al. ................ | 345/629 |
| 2006/0176318 A1* | 8/2006 | Martin et al. ............. | 345/629 |
| 2007/0143714 A1* | 6/2007 | Barbieri ..................... | 715/861 |
| 2010/0257210 A1* | 10/2010 | Witkin et al. .............. | 707/802 |
| 2010/0292002 A1* | 11/2010 | Ward et al. ................ | 463/30 |

* cited by examiner

*Primary Examiner* — David H Chu
(74) *Attorney, Agent, or Firm* — Blank Rome LLP

(57) ABSTRACT

Systems, methods, and computer-readable media for manipulating and/or mapping tiles of graphical object data are provided. For example, a method for manipulating an original tile of graphical data may include generating a mirrored copy of the original tile by mirroring the original tile with respect to a first side of the original tile, superimposing the mirrored copy on the original tile, erasing a first portion of the superimposed mirrored copy of the original tile, and blending at least some of the remaining portion of the superimposed mirrored copy of the original tile with the original tile to create a manipulated tile. The manipulated version of the original tile may be patterned (e.g., in an extensible manner) along a layer of a virtual canvas that may have various aspect ratios, while maintaining a seamless or fluid transition between adjacent tiles.

19 Claims, 19 Drawing Sheets

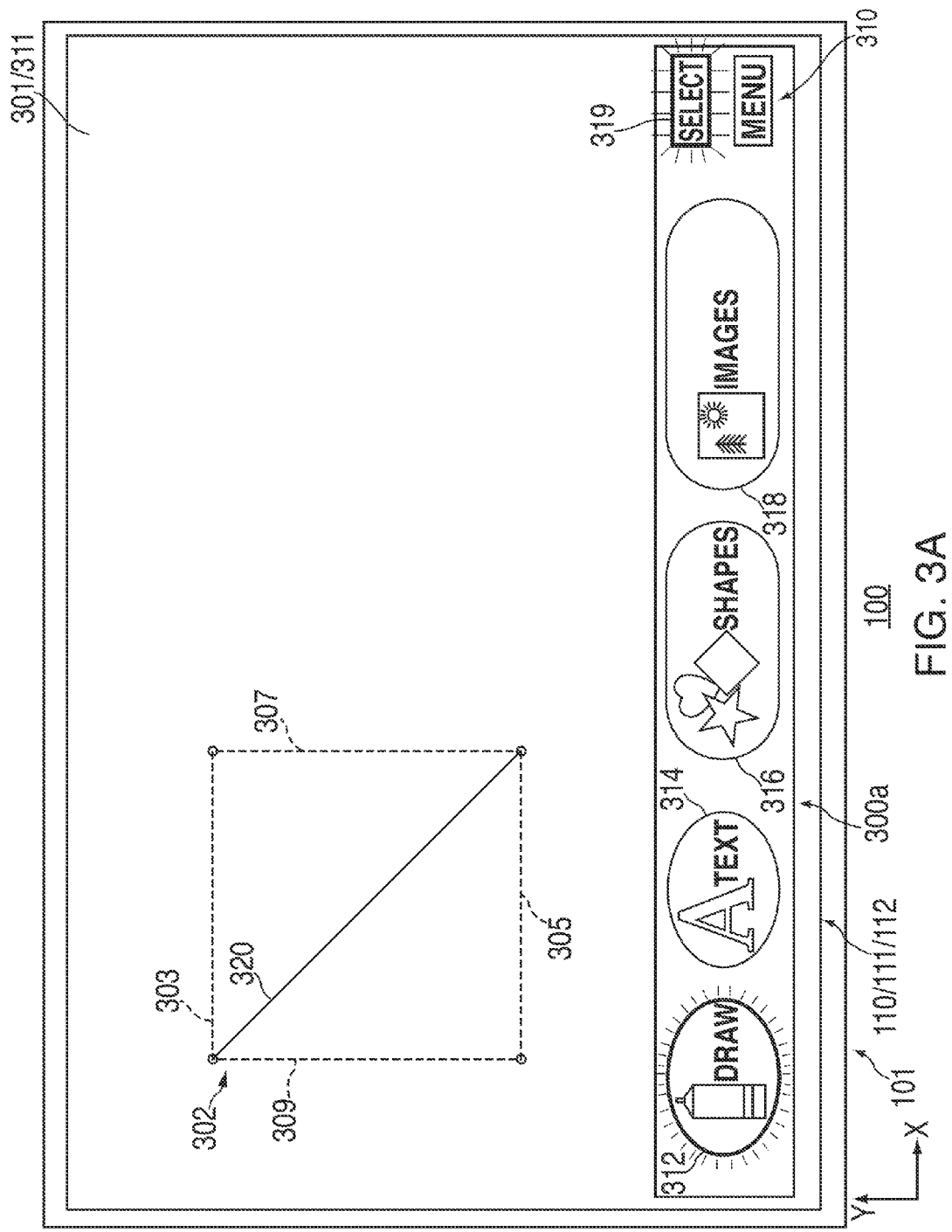

SYSTEMS, METHODS, AND COMPUTER-READABLE MEDIA FOR MANIPULATING AND MAPPING TILES OF GRAPHICAL OBJECT DATA

CROSS-REFERENCE TO RELATED APPLICATION

This application claims the benefit of U.S. Provisional Patent Application No. 61/493,509, filed Jun. 5, 2011, which is hereby incorporated by reference herein in its entirety.

FIELD OF THE INVENTION

This can relate to systems, methods, and computer-readable media for generating graphical object data and, more particularly, to systems, methods, and computer-readable media for manipulating and mapping tiles of graphical object data using an electronic device.

BACKGROUND OF THE DISCLOSURE

Some electronic devices include a graphical display system for generating and presenting graphical objects, such as free-form drawing strokes, images, strings of text, and drawing shapes, on a display. A user of such devices may interact with the graphical display system via a user interface to create different graphical objects in a tile that may be mapped in a pattern across a background layer. However, noise often occurs at the boundary of two adjacent tiles.

SUMMARY OF THE DISCLOSURE

Systems, methods, and computer-readable media for manipulating and mapping tiles of graphical object data are provided.

Rather than simply mapping a pattern of an original single tile of graphical object data in a layer on a virtual canvas or workspace, a graphical display system of an electronic device may be configured to manipulate the graphical object content of the original tile to generate a manipulated version of that original tile. The manipulated version of the original tile may be patterned more smoothly than the original tile along a layer of a virtual canvas. For example, the manipulated version of the original tile may be patterned extensibly along a virtual canvas layer that may have various aspect ratios, while a seamless or fluid transition between adjacent tiles may be maintained.

In some embodiments, there is provided a method for manipulating an original tile of graphical data. The method may include generating a mirrored copy of the original tile by mirroring the original tile with respect to a first side of the original tile. The method may also include superimposing the mirrored copy on the original tile and then erasing a first portion of the superimposed mirrored copy. The method may also include blending at least some of the remaining portion of the superimposed mirrored copy with the original tile to create a manipulated tile.

For example, in some embodiments, the first portion of the superimposed mirrored copy may be a portion of the superimposed mirrored copy that is not within a threshold distance of the first side of the original tile. In some embodiments, the blending may include altering the opaqueness of at least some of the remaining portion of the superimposed mirrored copy. In some embodiments, the method may also include pinning the manipulated tile to the bottom center of a layer of a canvas, and then patterning a copy of the manipulated tile adjacent the first side of the pinned manipulated tile and/or patterning a copy of the manipulated tile away from the pinned manipulated tile in a first direction that is perpendicular to the first side.

In some embodiments, the method may also include generating a mirrored copy of the manipulated tile by mirroring the manipulated tile with respect to a second side of the manipulated tile. Next, the method may include superimposing the mirrored copy of the manipulate tile on the manipulated tile and erasing a first portion of the superimposed mirrored copy of the manipulated tile. Then, the method may include blending at least some of the remaining portion of the superimposed mirrored copy of the manipulated tile with the manipulated tile to create an additionally manipulated tile. For example, in some embodiments, the second portion of the superimposed mirrored copy of the manipulated tile may include a portion of the superimposed mirrored copy of the manipulated tile that is not within a threshold distance of the second side of the manipulated tile. The blending of at least some of the remaining portion of the superimposed mirrored copy of the manipulated tile may include altering the opaqueness of at least some of the remaining portion of the superimposed mirrored copy of the manipulated tile. Next, the method may include pinning the additionally manipulated tile to the bottom center of a layer of a canvas and then patterning a copy of the additionally manipulated tile adjacent the first side of the pinned additionally manipulated tile and/or patterning a copy of the additionally manipulated tile away from the pinned additionally manipulated tile in a first direction that is perpendicular to the second side.

In other embodiments, there is provided a computer-readable media for controlling an electronic device. The computer-readable media may include computer-readable code recorded thereon for generating a mirrored copy of the original tile by mirroring the original tile with respect to a first side of the original tile, superimposing the mirrored copy on the original tile, erasing a first portion of the superimposed mirrored copy, and blending at least some of the remaining portion of the superimposed mirrored copy with the original tile to create a manipulated tile.

In yet other embodiments, there is provided a graphical display system that may include a graphical object manipulating module that generates a mirrored copy of an original tile by mirroring the original tile with respect to a first side of the original tile, superimposes the mirrored copy on the original tile, erases a first portion of the superimposed mirrored copy, and blends at least some of the remaining portion of the superimposed mirrored copy with the original tile to create a manipulated tile.

In still yet other embodiments, there is provided a machine implemented method in an environment which uses an application programming interface ("API"). The method may include transferring a manipulation call through the API to cause a mirrored copy of an original tile to be generated by mirroring the original tile with respect to a first side of the original tile, the mirrored copy to be superimposed on the original tile, a first portion of the superimposed mirrored copy to be erased, and at least some of the remaining portion of the superimposed mirrored copy to be blended with the original tile to create a manipulated tile.

In still yet other embodiments, there is provided a machine-readable storage medium storing executable instructions that when executed by a data processing system cause the data processing system to perform a method in an environment that uses an application programming interface ("API"). The method may include calling, through the API, to obtain an original tile of graphical data, and receiving a return through the API, the return being generated by an API-implementing component that generates a mirrored copy of the original tile by mirroring the original tile with respect to a first side of the original tile, superimposes the mirrored copy on the original tile, erases a first portion of the superimposed mirrored copy, and blends at least some of the remaining portion of the superimposed mirrored copy with the original tile to create a manipulated tile.

In still yet other embodiments, there is provided a data processing system that may include a processor to execute instructions and a memory coupled with the processor to store instructions, which when executed by the processor, cause the processor to perform operations to generate an application programming interface ("API") that allows an API-calling component to perform operations. The operations may be to generate a mirrored copy of the original tile by mirroring the original tile with respect to a first side of the original tile, superimpose the mirrored copy on the original tile, erase a first portion of the superimposed mirrored copy, and blend at least some of the remaining portion of the superimposed mirrored copy with the original tile to create a manipulated tile.

In still yet other embodiments, there is provided a machine-readable storage medium that provides instructions that, if executed by a processor, will cause the processor to generate an application programming interface ("API") that allows an API-implementing component to perform operations. The operations include generating a mirrored copy of the original tile by mirroring the original tile with respect to a first side of the original tile, superimposing the mirrored copy on the original tile, erasing a first portion of the superimposed mirrored copy, and blending at least some of the remaining portion of the superimposed mirrored copy with the original tile to create a manipulated tile.

In still yet other embodiments, there is provided a data processing system that may include a memory to store program code and a processor to execute the program code to generate an application programming interface ("API"), which may include means for generating a mirrored copy of the original tile by mirroring the original tile with respect to a first side of the original tile, means for superimposing the mirrored copy on the original tile, means for erasing a first portion of the superimposed mirrored copy, and means for blending at least some of the remaining portion of the superimposed mirrored copy with the original tile to create a manipulated tile.

In still yet other embodiments, there is provided a data processing system that may include an application programming interface ("API")-implementing component and an API to interface the API-implementing component with an API-calling component. The API may include means for generating a mirrored copy of the original tile by mirroring the original tile with respect to a first side of the original tile, means for superimposing the mirrored copy on the original tile, means for erasing a first portion of the superimposed mirrored copy, and means for blending at least some of the remaining portion of the superimposed mirrored copy with the original tile to create a manipulated tile.

In still yet other embodiments, there is provided a data processing system that may include a processor to execute instructions and a memory coupled with the processor to store instructions, which when executed by the processor, cause the processor to perform operations to generate an application programming interface ("API")-implementing component that implements an API. The API exposes one or more functions to an API-calling component. The API may include a function to generate a mirrored copy of an original tile by mirroring the original tile with respect to a first side of the original tile, a function to superimpose the mirrored copy on the original tile, a function to erase a first portion of the superimposed mirrored copy, and a function to blend at least some of the remaining portion of the superimposed mirrored copy with the original tile to create a manipulated tile.

In still yet other embodiments, there is provided a data processing system that may include a processor to execute instructions and a memory coupled with the processor to store instructions, which when executed by the processor, cause the processor to interface a component of the data processing system with an application programming interface ("API")-calling component and to perform operations. The operations may include generating a mirrored copy of the original tile by mirroring the original tile with respect to a first side of the original tile, superimposing the mirrored copy on the original tile, erasing a first portion of the superimposed mirrored copy, and blending at least some of the remaining portion of the superimposed mirrored copy with the original tile to create a manipulated tile.

In still yet other embodiments, there is provided an apparatus that may include a machine-readable storage medium that provides instructions that, when executed by a machine, will cause the machine to allow an application programming interface ("API")-calling component to perform operations. The operations may include generating a mirrored copy of the original tile by mirroring the original tile with respect to a first side of the original tile, superimposing the mirrored copy on the original tile, erasing a first portion of the superimposed mirrored copy, and blending at least some of the remaining portion of the superimposed mirrored copy with the original tile to create a manipulated tile.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION OF THE DISCLOSURE

Systems, methods, and computer-readable media for manipulating and mapping tiles of graphical object data are provided and described with reference to FIGS. 1-6.

Figure 1:
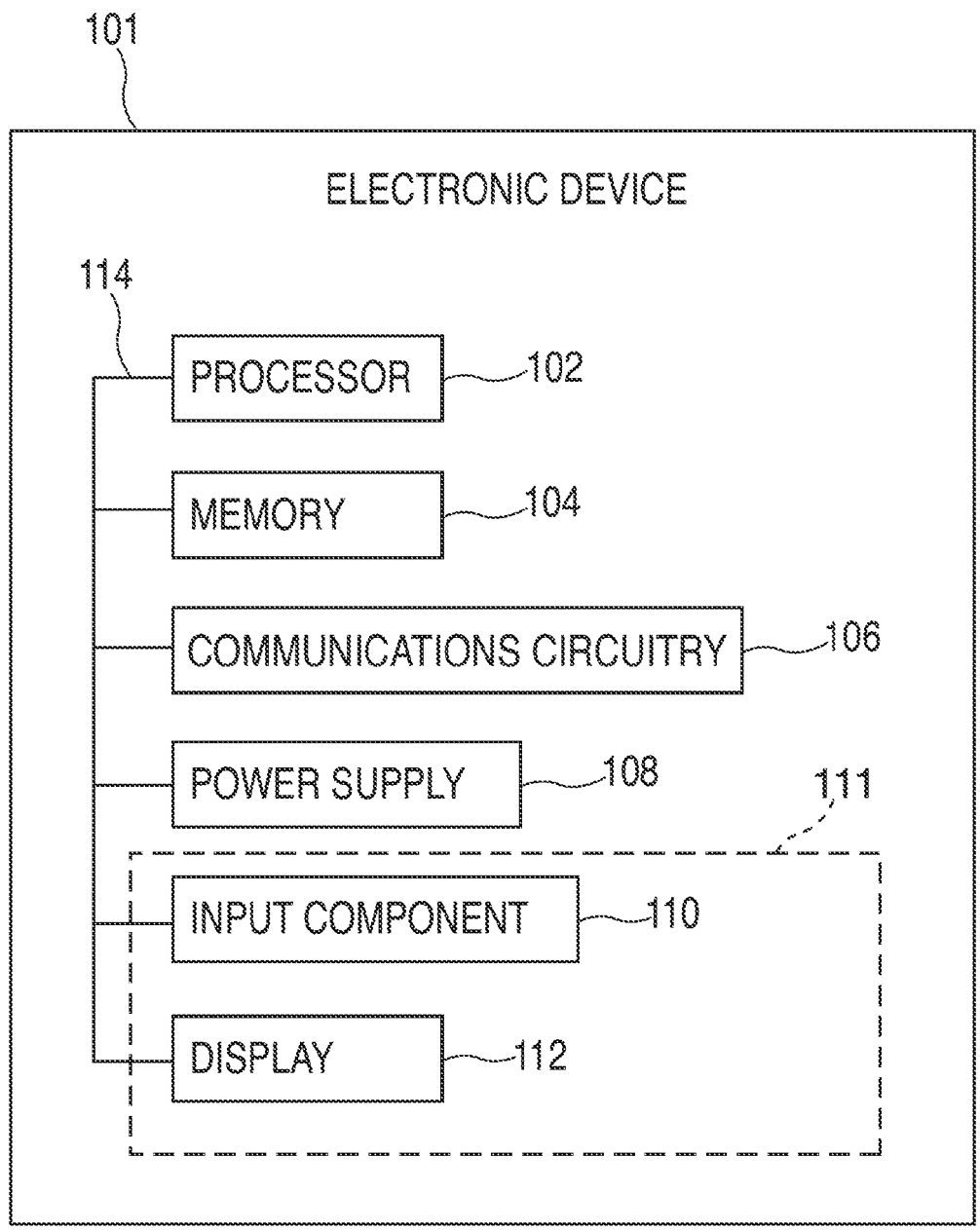
FIG. 1 is a schematic view of an illustrative electronic device for manipulating and mapping tiles of graphical object data, in accordance with some embodiments of the invention.

FIG. 1 is a schematic view of an illustrative electronic device 100 for manipulating and/or mapping tiles of graphical object data in accordance with some embodiments of the invention. Electronic device 100 may be any portable, mobile, or hand-held electronic device configured to manipulate and/or map tiles of graphical object data wherever the user travels. Alternatively, electronic device 100 may not be portable, but may instead be generally stationary. Electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, boom box, modem, router, printer, and combinations thereof. In some embodiments, electronic device 100 may perform a single function (e.g., a device dedicated to manipulating and/or mapping tiles of graphical object data) and, in other embodiments, electronic device 100 may perform multiple functions (e.g., a device that manipulates and/or maps tiles of graphical object data, plays music, and receives and transmits telephone calls).

Electronic device 100 may include a processor or control circuitry 102, memory 104, communications circuitry 106, power supply 108, input component 110, and display 112. Electronic device 100 may also include a bus 114 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 1. For example, electronic device 100 may include motion-sensing circuitry, a compass, positioning circuitry, or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 106 may be provided to allow device 100 to communicate with one or more other electronic devices or servers using any suitable communications protocol. For example, communications circuitry 106 may support Wi-Fi (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 106 may also include circuitry that can enable device 100 to be electrically coupled to another device (e.g., a host computer or an accessory device) and communicate with that other device, either wirelessly or via a wired connection.

Power supply 108 may provide power to one or more of the components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, proximity sensor, light detector, motion sensors, and combinations thereof. Each input component 110 can be configured to provide one or more dedicated control functions for making selections or issuing commands associated with operating device 100.

Electronic device 100 may also include one or more output components that may present information (e.g., graphical, audible, and/or tactile information) to a user of device 100. An output component of electronic device 100 may take various forms, including, but not limited to, audio speakers, headphones, audio line-outs, visual displays, antennas, infrared ports, rumblers, vibrators, or combinations thereof.

For example, electronic device 100 may include display 112 as an output component. Display 112 may include any suitable type of display or interface for presenting visual data to a user. In some embodiments, display 112 may include a display embedded in device 100 or coupled to device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 112 can include a movable display or a projecting system for providing a display of content on a surface remote from electronic device 100, such as, for example, a video projector, a head-up display, or a three-dimensional (e.g., holographic) display. As another example, display 112 may include a digital or mechanical viewfinder, such as a viewfinder of the type found in compact digital cameras, reflex cameras, or any other suitable still or video camera.

In some embodiments, display 112 may include display driver circuitry, circuitry for driving display drivers, or both. Display 112 can be operative to display content (e.g., media playback information, application screens for applications implemented on electronic device 100, information regarding ongoing communications operations, information regarding incoming communications requests, device operation screens, etc.) that may be under the direction of processor 102. Display 112 can be associated with any suitable characteristic dimensions defining the size and shape of the display. For example, the display can be rectangular or have any other polygonal shape, or alternatively can be defined by a curved or other non-polygonal shape (e.g., a circular display). Display 112 can have one or more primary orientations for which an interface can be displayed, or can instead or in addition be operative to display an interface along any orientation selected by a user.

It should be noted that one or more input components and one or more output components may sometimes be referred to collectively herein as an input/output ("I/O") component or I/O interface (e.g., input component 110 and display 112 as I/O component or I/O interface 111). For example, input component 110 and display 112 may sometimes be a single I/O component 111, such as a touch screen, that may receive input information through a user's touch of a display screen and that may also provide visual information to a user via that same display screen.

Processor 102 of device 100 may include any processing circuitry operative to control the operations and performance of one or more components of electronic device 100. For example, processor 102 may be used to run operating system applications, firmware applications, graphics editing applications, media playback applications, media editing applications, or any other application. In some embodiments, processor 102 may receive input signals from input component 110 and/or drive output signals through display 112. Processor 102 may load a user interface program (e.g., a program stored in memory 104 or another device or server) to determine how instructions or data received via an input component 110 may manipulate the way in which information is stored and/or provided to the user via an output component (e.g., display 112). Electronic device 100 (e.g., processor 102, memory 104, or any other components available to device 100) may be configured to process graphical data at various resolutions, frequencies, intensities, and various other characteristics as may be appropriate for the capabilities and resources of device 100.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Figure 2:
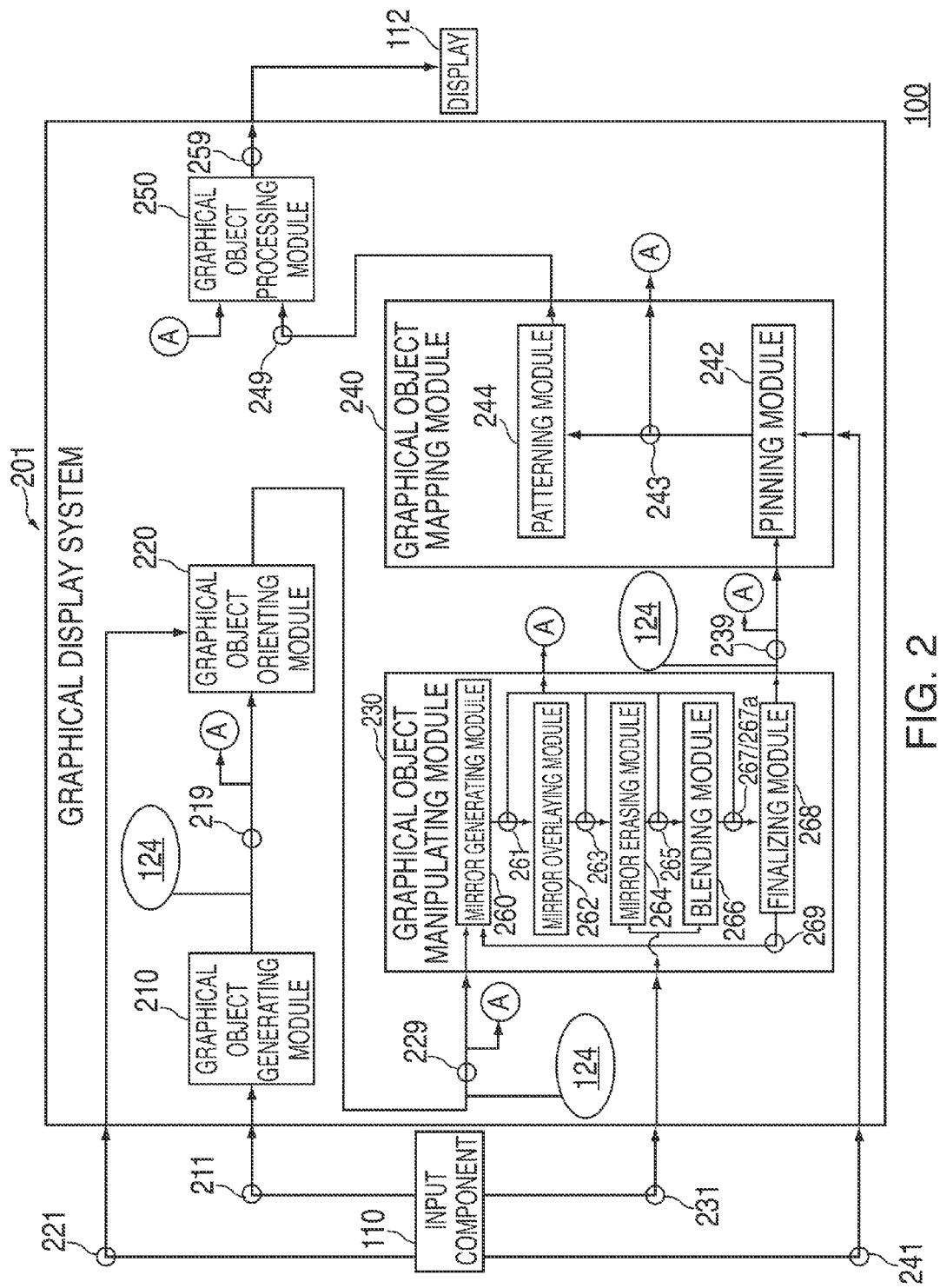
FIG. 2 is a schematic view of an illustrative portion of the electronic device of FIG. 1, in accordance with some embodiments of the invention.

FIG. 2 shows a schematic view of a graphical display system 201 of electronic device 100 that may be provided to generate and manipulate graphical data for presentation to a user. For example, in some embodiments, graphical display system 201 may generate and manipulate graphical data representations of two-dimensional and/or three-dimensional objects that may define at least a portion of a visual screen of information to be presented as an image on a display, such as display 112. Graphical display system 201 may be configured to generate and manipulate realistic animated images in real time (e.g., using about 30 or more screens or frames per second).

As shown in FIG. 2, for example, graphical display system 201 may include a graphical object generating module 210 that may define and generate at least a portion of the graphical contents of each of the screens to be rendered for display. Such graphical screen contents may be based on the one or more applications being run by electronic device 100 as well as any input instructions being received by device 100 (e.g., via input component 110). The graphical screen contents can include any suitable graphical data, including, but not limited to, free-form drawing strokes, image content (e.g., photographic images), textual information (e.g., one or more alphanumeric characters in a text string), drawing shape objects, video data based on images of a video program, and combinations thereof. For example, an application run by electronic device 100 may be any suitable application that may provide a virtual canvas or workspace on which a user may create and manipulate graphical objects, such as free-form drawing strokes, images, drawing shapes, and text strings (e.g., Photoshop™ or Illustrator™ by Adobe Systems Incorporated or Microsoft Paint™ by Microsoft Corporation). Graphical object generating module 210 may define and generate at least some of these types of graphical objects to be rendered or otherwise processed for display by graphical display system 201. For example, graphical object generating module 210 may define and generate drawing stroke graphical objects, image graphical objects, drawing shape graphical objects, and/or text string graphical objects to be processed for display by graphical display system 201 on display 112 of electronic device 100.

Graphical object data may generally be represented in two ways or as two types of data (i.e., pixel data and analytical graphic objects or "vector objects"). Graphical object data of the pixel data type may be collections of one or more pixels (e.g., samples of color and/or other information including transparency and the like) that may be provided in various raster or bitmap layers on a canvas or workspace. On the other hand, graphical object data of the vector object type may be an abstract graphic entity (e.g., such that its appearance, position, and orientation in a canvas or workspace may be defined analytically through geometrical formulas, coordinates, and the like). Some pixel data may be provided with additional position and orientation information that can specify the spatial relationship of its pixels relative to a canvas or workspace containing the pixel data, which may be considered a bitmap vector graphic object when placed in a vector graphics document. Before the application of any additional transformation or deformation, such a bitmap vector object may be equivalent to a rectangular vector object texture-mapped to the pixel data. While at least some of the embodiments herein may be specifically described with reference to graphical object data of the pixel data type, it is to be understood that at least some of the systems, methods, and computer-readable media described herein may additionally or alternatively manipulate and/or map tiles of graphical object data of the vector object type and/or of some combination of the pixel data type and the vector object type.

Graphical object generating module 210 may define and generate various types of graphical objects of an application document or work, such as drawing stroke graphical objects, image graphical objects, drawing shape graphical objects, and/or text string graphical objects, which may be processed for display by graphical display system 201 on display 112 of electronic device 100. In some embodiments, a layer of graphical object data may be generated and presented on a virtual canvas or workspace by system 201 that may include a single tile of graphical object data mapped out in a repeating pattern of multiple instances of that single tile. Such a layer of graphical object data may then be used in any suitable way, including, but not limited to, as a background for any suitable application (e.g., Photo Booth™ by Apple Inc. of Cupertino, Calif., or any other suitable application that may utilize a layer of graphical object data provided by a pattern of multiple instances of a single tile of graphical object data).

Therefore, graphical object generating module 210 may be configured to define, edit, and/or generate an original single tile of graphical object data to be patterned. Such an original single tile may be an individual bitmap, pixmap, or raster layer of pixels, and may be independently rendered for display. Graphical object generating module 210 may receive graphical object input information 211 from various input sources for defining one or more graphical object properties of an original single tile of graphical object data to be patterned. For example, such input sources may be the one or more applications being run by electronic device 100 and/or any user input instructions being received by device 100 (e.g., via input component 110, as shown in FIG. 2). In some embodiments, based on at least a portion of the received graphical object input information 211, graphical object generating module 210 may be configured to define and generate at least a portion of one or more graphical objects in an original single tile. For example, as shown in FIG. 2, graphical object generating module 210 may generate original tile graphical object content 219, which may define the graphical object content of the single original tile to be patterned. The content of a graphical object defined by original tile graphical object content 219 may be any suitable type of graphical content, such as a drawing stroke, an image, a string of text, a drawing shape, and the like. In some embodiments, original tile graphical object content 219 may be at least partially based on one or more graphical object properties defined by graphical object input information 211.

For example, when graphical object generating module 210 is generating a drawing stroke graphical object as at least a portion of the graphical object content of a single original tile to be patterned, graphical object input information 211 may define one or more drawing stroke properties of that drawing stroke graphical object. A drawing stroke graphical object may be considered a path along which a drawing stroke input tool (e.g., a stamp) may be applied. Such a drawing stroke input tool may define a particular set of pixel data to be applied on a display when the stamp is used for creating a drawing stroke graphical object along a defined trail. For example, such a trail may define a path on the display along which an associated drawing stroke input tool may repeatedly apply its pixel data for generating a drawing stroke graphical object on the display. Therefore, graphical object input information 211 may define one or more drawing stroke input tool properties and/or one or more trail properties for a particular drawing stroke graphical object of a single original tile to be patterned. A stamp drawing stroke input tool may be defined by any suitable stamp property or set of stamp properties including, but not limited to, shape, size, pattern, orientation, hardness, color, transparency, spacing, and the like. A drawing stroke trail may be defined by any suitable trail property or set of trail properties including, but not limited to, length, path, and the like. Once drawing stroke graphical object input information 211 has been received, graphical object generating module 210 may generate appropriate original tile drawing stroke graphical object content 219, such as a particular pixel data set for a stamp applied along a particular trail in the original tile.

As another example, when graphical object generating module 210 is generating an image graphical object as at least a portion of the graphical object content of a single original tile to be patterned, graphical object input information 211 may define one or more images of that image graphical object. An image may be any suitable image file that can be imported into a single original tile to be patterned. Such an image may be defined by an address at which image data is stored (e.g., in memory 104 of device 100). An image file may be in any suitable format for providing image content to system 201 including, but not limited to, a JPEG file, a TIFF file, a PNG file, a GIF file, and the like. Once image graphical object input information 211 has been received, graphical object generating module 210 may generate appropriate original tile image graphical object content 219, such as an image file in the original tile.

As another example, when graphical object generating module 210 is generating a text string graphical object as at least a portion of the graphical object content of a single original tile to be patterned, graphical object input information 211 may define one or more characters, as well as a selection of one or more properties that may be used to define various characteristics of the selected characters of that text string graphical object. For example, a text string character may be a letter, number, punctuation, or other symbol that may be used in the written form of one or more languages. Symbol characters may include, but are not limited to, representations from a variety of categories, such as mathematics, astrology, astronomy, chess, dice, ideology, musicology, economics, politics, religion, warning signs, meteorology, and the like. A property that may be used to define a characteristic of a text string character may include, but is not limited to, a font type (e.g., Arial or Courier), a character size, a style type (e.g., bold or italic), a color, and the like. Once text string graphical object input information 211 has been received, graphical object generating module 210 may generate appropriate original tile text string graphical object content 219, such as a string of one or more particular character glyphs in the original tile.

As another example, when graphical object generating module 210 is generating a drawing shape graphical object as at least a portion of the graphical object content of a single original tile to be patterned, graphical object input information 211 may define a pre-defined shape (e.g., a box, a star, a heart, etc.) or a free-form drawing input indicative of a user-defined shape of that drawing shape graphical object. Once drawing shape graphical object input information 211 has been received, graphical object generating module 210 may generate appropriate original tile drawing shape graphical object content 219, such as an appropriate boundary representation of the defined drawing shape in the original tile.

Regardless of the type of graphical object to be created, a user may interact with one or more graphics editing applications or drawing applications running on device 100 via input component 110 to generate graphical object input information 211 for defining one or more of the graphical object properties of original tile graphical object content 219, which may define an original single tile of graphical object data to be patterned. Alternatively or additionally, in other embodiments, an application running on device 100 may be configured to automatically generate at least a portion of graphical object input information 211 for defining one or more of the graphical object properties of original tile graphical object content 219, which may define an original single tile of graphical object data to be patterned.

As shown in FIG. 2, for example, graphical display system 201 may also include a graphical object processing module 250 that may process the graphical object content generated by graphical object generating module 210 (e.g., original tile graphical object content 219), such that a single original tile of graphical object content may be presented to a user on display 112 of device 100. In some embodiments, graphical object processing module 250 may be configured to render or otherwise process any received graphical object content (e.g., original tile graphical object content 219), and may therefore be configured to provide processed graphical object data for presentation on display 112 (e.g., processed graphical object data 259 based on the graphical object content provided to graphical object processing module 250).

For example, graphical object processing module 250 may be configured to perform various types of graphics computations or processing techniques and/or implement various rendering algorithms on the received graphical object content so that graphical object processing module 250 may process the graphical data necessary to define at least a portion of the graphical object layer to be displayed on display 112 (e.g., the graphical object portion of the layer on a virtual canvas). Such processing may include, but is not limited to, matrix transformations, scan-conversions, various rasterization techniques, various techniques for three-dimensional vertices and/or three-dimensional primitives, texture blending, and the like.

Processed graphical object data 259 generated by graphical object processing module 250 may include one or more sets of pixel data, each of which may be associated with a respective pixel to be displayed by display 112 when presenting a graphical object portion of that particular screen's virtual canvas to a user of device 100. For example, each of the sets of pixel data included in processed graphical object data 259 generated by graphical object processing module 250 may be correlated with coordinate values that may identify a particular one of the pixels to be displayed by display 112, and each pixel data set may include a color value for its particular pixel as well as any additional information that may be used to appropriately shade or provide other cosmetic features for its particular pixel. A portion of this pixel data for processed graphical object data 259 may represent at least a portion of the original tile graphical object content 219 for an original tile to be patterned. Graphical object processing module 250 may be configured to transmit the pixel data sets of processed graphical object data 259 for a particular screen to display 112 via any suitable process for presentation to a user.

As shown in FIG. 2, for example, graphical display system 201 may also include a graphical object orienting module 220 that may be utilized to determine in which direction or directions the tile is to be patterned along a layer of a virtual canvas. Generally, a tile may be a parallelogram or any two-dimensional shape having any suitable number of sides, and the tile may be patterned in any suitable number of directions out away from an initial instance of the tile along the layer. For example, an original tile may be square-shaped, with a top side, a bottom side opposite the top side, a left side, and a right side opposite the left side. In some embodiments, such a tile may be patterned in at least a first vertical direction, such as one above the other (e.g., such that the bottom side of a second instance of the tile may be placed adjacent the top side of a first instance of the tile). In other embodiments, such a tile may be patterned in at least a first horizontal direction, such as one next to the other (e.g., such that the left side of a second instance of the tile may be placed adjacent the right side of a first instance of the tile). In yet other embodiments, such a tile may be patterned in both a horizontal direction and a vertical direction.

Graphical object orienting module 220 may receive graphical object orientation information 221 from various input sources for defining one or more directions in which the original tile defined by original tile graphical object content 219 may be patterned along a layer of a virtual canvas. For example, such input sources may be the one or more applications being run by electronic device 100 and/or any user input instructions being received by device 100 (e.g., via input component 110, as shown in FIG. 2). In some embodiments, based on at least a portion of the received graphical object orientation information 221, graphical object orienting module 220 may be configured to define at least one direction along which the original tile defined by original tile graphical object content 219 may be patterned along a layer of a virtual canvas. For example, as shown in FIG. 2, graphical object orienting module 220 may generate oriented original tile graphical object content 229, which may define not only the graphical object content of the single original tile to be patterned (e.g., the same or substantially similar content as original tile graphical object content 219), but also orientation content for indicating the one or more directions along which the original tile defined by that graphical object content may be patterned.

Therefore, the graphical object content of an original defined by oriented original tile graphical object content 229 may be any suitable type of graphical content, such as a drawing stroke, an image, a string of text, a drawing shape, and combinations thereof. The orientation content defined by oriented original tile graphical object content 229 that may indicate the one or more directions along which the original tile defined by that graphical object content may be patterned may be any suitable type of orientation content. For example, orientation content of oriented original tile graphical object content 229 may define at least one such direction by identifying a particular side of the original tile. Such an identified side of the original tile may be the side of the tile against which another instance of the tile is to be positioned for patterning the original tile. For example, following the above example of a square original tile, orientation content of oriented original tile graphical object content 229 may be defined to identify a top side of the original tile. Such orientation content may indicate that the original tile is to be patterned in a first vertical direction by positioning the bottom side of a second instance of the tile adjacent the identified top side of an initial instance of the tile. Additionally or alternatively, orientation content of oriented original tile graphical object content 229 may be defined to identify a right side of such an original tile. Such orientation content may indicate that the original tile is to be patterned in a first horizontal direction by positioning the left side of a second instance of the tile adjacent the identified right side of an initial instance of the tile.

In some embodiments, orientation content of oriented original tile graphical object content 229 may be at least partially based on one or more orientation properties defined by graphical object orientation information 221. A user may interact with one or more applications running on device 100 via input component 110 to generate graphical object orientation information 221 for defining one or more of the directions along which the original tile defined by oriented original tile graphical object content 229 may be patterned. Alternatively or additionally, in other embodiments, an application running on device 100 may be configured to automatically generate at least a portion of graphical object orientation information 221 for defining one or more of the directions along which the original tile defined by oriented original tile graphical object content 229 may be patterned.

As shown in FIG. 2, for example, graphical object processing module 250 may be configured to receive and process the graphical object content generated by graphical object generating module 220 (e.g., oriented original tile graphical object content 229), such that the graphical object content of an oriented original tile may be presented to a user on display 112 of device 100. In some embodiments, graphical object processing module 250 may be configured to render or otherwise process any received graphical object content (e.g., oriented original tile graphical object content 229), and may therefore be configured to provide processed graphical object data for presentation on display 112 (e.g., processed graphical object data 259 based on the graphical object content provided to graphical object processing module 250 by graphical object orienting module 220).

Rather than simply mapping a pattern of an original single tile of graphical object data that may be defined by oriented original tile graphical object content 229 in a layer on a virtual canvas or workspace, system 201 may be configured to manipulate oriented original tile graphical object content 229 of the original tile to generate a manipulated version of that original tile. The manipulated version of the original tile may be patterned extensibly along a layer that may have various aspect ratios, while maintaining a seamless or fluid transition between adjacent tiles.

As shown in FIG. 2, for example, graphical display system 201 may also include a graphical object manipulating module 230 that may be utilized to manipulate an original tile into a manipulated original tile that may be patterned more smoothly than the original tile along a layer of a virtual canvas. For example, graphical object manipulating module 230 may receive oriented original tile graphical object content 229 and may manipulate oriented original tile graphical object content 229 to generate manipulated original tile graphical object content 239. Such manipulated original tile graphical object content 239 may define the graphical object content of a single manipulated original tile to be patterned on a layer of a virtual canvas rather than the graphical object content of the single original tile defined by original tile graphical object content 219 and/or oriented original tile graphical object content 229.

As also shown in FIG. 2, graphical object manipulating module 230 may receive graphical object manipulation information 231 from various input sources for defining one or more characteristics with which oriented original tile graphical object content 229 may be manipulated. For example, such input sources may be the one or more applications being run by electronic device 100 and/or any user input instructions being received by device 100 (e.g., via input component 110, as shown in FIG. 2). In some embodiments, based on at least a portion of the received graphical object manipulation information 231, graphical object manipulating module 230 may be configured to manipulate the oriented original tile defined by oriented original tile graphical object content 229 in one or more particular ways.

Graphical object manipulating module 230 may be configured to manipulate received oriented original tile graphical object content 229 in any suitable way for generating manipulated original tile graphical object content 239. For example, graphical object manipulating module 230 may be configured to superimpose, overlay, or otherwise place a mirrored copy of the original tile onto the original tile, erase a portion of the superimposed mirrored copy, and then blend a remaining portion of the superimposed mirrored copy with a portion of the original tile to create a manipulated original tile for patterning. The manner in which the original tile may be mirrored may be based on the orientation content of oriented original tile graphical object content 229. The portion of the superimposed mirrored copy of the original tile that may be erased may be based on the orientation content of oriented original tile graphical object content 229 and/or based on the graphical object content of oriented original tile graphical object content 229 and/or based on graphical object manipulation information 231 provided by a user or an application of device 100. The manner in which a remaining portion of the superimposed mirrored copy may be blended with a portion of the original tile to create a manipulated original tile for patterning may be based on graphical object manipulation information 231 provided by a user or an application of device 100.

For example, as shown in FIG. 2, graphical object manipulating module 230 may include a mirror generating module 260, a mirror overlaying module 262, a mirror erasing module 264, a blending module 266, and a finalizing module 268. Mirror generating module 260 may be configured to receive oriented original tile graphical object content 229 and to generate a mirrored copy of the graphical object content of oriented original tile graphical object content 229. Mirror generating module 260 may be configured to generate a mirrored copy of the original tile graphical object content about or across any suitable mirror axis. In some embodiments, the mirror axis may be along any suitable side of the original tile. For example, the mirror axis utilized by mirror generating module 260 to generate a mirrored copy of the graphical object content of oriented original tile graphical object content 229 may be an axis that runs along at least a portion of a side of the original tile identified by the orientation content of oriented original tile graphical object content 229 (e.g., the orientation content that may identify at least one direction along which the original tile may be patterned). Mirror generating module 260 may also be configured to pass oriented original tile graphical object content 229 and the mirrored copy of the graphical object content of oriented original tile graphical object content 229 on to any other portion of graphical display system 201 as mirrored original tile graphical object content 261.

Mirror overlaying module 262 may be configured to receive mirrored original tile graphical object content 261 and to overlay, superimpose, or otherwise place the mirrored copy of the graphical object content of oriented original tile graphical object content 229 onto the graphical object content of oriented original tile graphical object content 229. Mirror overlaying module 262 may be configured to overlay the mirrored copy of the original tile onto the original tile by aligning similar sides of the two tiles. Mirror overlaying module 262 may also be configured to pass the original tile with the superimposed mirrored copy of the original tile on to any other portion of graphical display system 201 as superimposed mirrored original tile graphical object content 263.

Mirror erasing module 264 may be configured to receive superimposed mirrored original tile graphical object content 263 and to erase a portion of the graphical object content of the superimposed mirrored copy of the original tile while maintaining the remaining portion of the graphical object content of the superimposed mirrored copy of the original tile as well as maintaining all of the graphical object content of the original tile. Mirror erasing module 264 may also be configured to pass the original tile with the remaining portion of the partially erased superimposed mirrored copy of the original tile on to any other portion of graphical display system 201 as partially-erased superimposed mirrored original tile graphical object content 265.

Mirror erasing module 264 may be configured to determine which portion of the superimposed mirrored copy of the original tile to erase based on any suitable information, such as the orientation content of oriented original tile graphical object content 229, the graphical object content of oriented original tile graphical object content 229, and/or graphical object manipulation information 231 provided by a user or an application of device 100. For example, the portion of the superimposed mirrored copy to be erased by mirror erasing module 264 may be the portion not within a threshold distance or range of at least a portion of a side of the original tile identified by the orientation content of oriented original tile graphical object content 229 (e.g., the orientation content that may identify at least one direction along which the original tile may be patterned). Additionally or alternatively, the portion of the superimposed mirrored copy to be erased by mirror erasing module 264 may be determined based on the graphical object content of the original tile, the graphical object content of the mirrored copy, and/or the relationship between the graphical object content of the original tile and the graphical object content of the mirrored copy when superimposed on the graphical object content of the original tile. Additionally or alternatively, the portion of the superimposed mirrored copy to be erased by mirror erasing module 264 may be determined based on graphical object manipulation information 231 provided by a user or an application of device 100.

In some embodiments, the graphical object content of the original tile may dictate which portion of the mirrored copy is to be erased. For example, if the graphical object content of the original tile is a texture of a more organic or natural design, then some randomness may be introduced into the determination of what portion of the mirrored copy is to be erased. However, if the graphical object content of the original tile is a more streamlined or harmonious texture, then a simpler or straight-lined erasing may be employed to determine what portion of the mirrored copy is to be erased. Generally, if a mirrored copy was generated by mirroring the original tile about a first side of the original tile (e.g., about a mirror axis that may at least partially align with that first side), then the portion of the superimposed mirrored copy to be erased may generally fall outside a specific threshold distance of that first side of the original tile.

It is to be understood that the number, configuration, functionality, and interconnection of the modules of graphical display system 201 are merely illustrative, and that the number, configuration, functionality, and interconnection of existing modules may be modified or omitted, additional modules may be added, and the interconnection of certain modules may be altered. As just one example, rather than mirror overlaying module 262 being interconnected between mirror generating module 260 and mirror erasing module 264, mirror erasing module 264 may be interconnected between mirror generating module 260 and mirror overlaying module 262. In such embodiments, a mirrored copy of an original tile may be passed from mirror generating module 260 on to mirror erasing module 264, which may erase a portion of the graphical object content of the mirrored copy of the original tile before passing a partially-erased mirrored copy of the original tile on to mirror overlaying module 262 for superimposing the partially-erased mirrored copy of the original tile onto the original tile.

Blending module 266 may be configured to receive partially-erased superimposed mirrored original tile graphical object content 265 and to blend at least a portion of the graphical object content of the original tile with at least some of the graphical object content of the remaining portion of the superimposed mirrored copy of the original tile. Blending module 266 may also be configured to pass the original tile blended with the partially-erased superimposed mirrored copy of the original tile on to any other portion of graphical display system 201 as blended partially-erased superimposed mirrored original tile graphical object content 267.

Blending module 266 may be configured to determine which portion of the graphical object content of the original tile and which portion of the graphical object content of the partially-erased superimposed mirrored copy of the original tile are to be blended together based on any suitable information, such as the graphical object content of partially-erased superimposed mirrored original tile graphical object content 265 and/or the graphical object manipulation information 231 provided by a user or an application of device 100. For example, the portion of the graphical object content of the original tile and/or the portion of the graphical object content of the partially-erased superimposed mirrored copy of the original tile to be blended may be determined based on the graphical object content of the original tile, the graphical object content of the remaining portion of the partially-erased mirrored copy, and/or the relationship between the graphical object content of the original tile and the remaining portion of the partially-erased mirrored copy when superimposed on the graphical object content of the original tile. Additionally or alternatively, the portion of the graphical object content of the original tile and/or the portion of the graphical object content of the partially-erased superimposed mirrored copy of the original tile to be blended may be determined based on graphical object manipulation information 231 provided by a user or an application of device 100.

Blending module 266 may be configured to blend a particular portion of the graphical object content of the original tile with a particular portion of the graphical object content of the partially-erased superimposed mirrored copy of the original tile using any suitable blending technique, including, but not limited to, blending with a soft eraser, blending with a soft eraser, transitioning the remaining portion of the superimposed mirrored copy from translucent at a first side to opaque at a second side (e.g., where the second side aligns with the side of the original tile used to generate the mirrored copy), or any combination thereof. Blending with a soft eraser brush may generally allow varying levels of opacity to be applied, such that the mirrored copy may be slowly blended with the original tile positioned under the mirrored copy. Blending with a hard eraser may generally be more effectively used on heavily textured graphical object content (e.g., a wood texture in which the graphical object content may have natural imperfections, crevices, knots, or noticeable markings that may be easily identifiable in the mirrored copy), such that portions of the mirrored copy may be entirely erased to fully expose the underlying original tile.

Moreover, blending module 266 may be configured to determine which one or more blending techniques are to be used for blending a particular portion of the original tile with a particular portion of the partially-erased superimposed mirrored copy of the original tile based on any suitable information, such as the graphical object content of partially-erased superimposed mirrored original tile graphical object content 265 and/or based on graphical object manipulation information 231 provided by a user or an application of device 100. For example, each blending technique to be used for blending a particular portion of the original tile with a particular portion of the partially-erased superimposed mirrored copy of the original tile may be determined by blending module 266 based on the graphical object content of the original tile, the graphical object content of the remaining portion of the partially-erased mirrored copy, and/or the relationship between the graphical object content of the original tile and the remaining portion of the partially-erased mirrored copy when superimposed on the graphical object content of the original tile. Additionally or alternatively, each blending technique to be used for blending a particular portion of the original tile with a particular portion of the partially-erased superimposed mirrored copy of the original tile may be determined by blending module 266 based on graphical object manipulation information 231 provided by a user or an application of device 100.

In some embodiments, the blending technique to be used may depend on the size of the partially-erased mirrored copy. For example, if it is large mirror, then a soft fade to 0% opacity may work well. However, if the size of the remaining superimposed mirrored copy is relatively small (e.g., as compared to the original tile), a hard edge eraser brush with a small amount of randomness to the angle and direction may work well. Typically however, a combination of the two may produce the best results.

Finalizing module 268 may be configured to receive blended partially-erased superimposed mirrored original tile graphical object content 267 and then either to finalize received graphical object content 267 as manipulated original tile graphical object content 239 for patterning or to pass received graphical object content 267 as partially-manipulated original tile graphical object content 269 on to mirror generating module 260 for additional manipulation. In some embodiments, finalizing module 268 may be configured to determine whether to finalize received graphical object content 267 as manipulated original tile graphical object content 239 for patterning or whether to pass received graphical object content 267 as partially-manipulated original tile graphical object content 269 on to mirror generating module 260 for additional manipulation based on the orientation content of oriented original tile graphical object content 229.

For example, as mentioned above, the orientation content of oriented original tile graphical object content 229 may identify one or more directions along which the tile may be patterned. Therefore, if the orientation content of oriented original tile graphical object content 229 only identifies one single direction along which the tile may be patterned, then finalizing module 268 may determine that blended graphical object content 267 may include graphical object content that was mirrored by mirror generating module 260 based on that single identified direction and, thus, that blended graphical object content 267 may be finalized and passed on to any other suitable component of graphical display system 201 as manipulated original tile graphical object content 239. However, if the orientation content of oriented original tile graphical object content 229 identifies multiple directions along which the tile may be patterned, then finalizing module 268 may determine that blended graphical object content 267 may only include graphical object content that was mirrored by mirror generating module 260 based on only one identified direction of those multiple directions and, thus, that blended graphical object content 267 may be passed on to mirror generating module 260 for additional manipulation as partially-manipulated original tile graphical object content 269.

If the orientation content of oriented original tile graphical object content 229 identifies multiple directions along which the tile may be patterned, such that finalizing module 268 may pass received graphical object content 267 as partially-manipulated original tile graphical object content 269 on to mirror generating module 260 for additional manipulation, mirror generating module 260 may be configured to manipulate partially-manipulated original tile graphical object content 269. For example, mirror generating module 260 may be configured to manipulate partially-manipulated original tile graphical object content 269 similarly to how mirror generating module 260 may be configured to manipulate the graphical object content of oriented original tile graphical object content 229, as described above. However, instead of using a first one of the multiple directions identified by the orientation content of oriented original tile graphical object content 229 to mirror partially-manipulated original tile graphical object content 269, mirror generating module 260 may be configured to mirror partially-manipulated original tile graphical object content 269 using a second one of the multiple directions identified by the orientation content of oriented original tile graphical object content 229. Mirror generating module 260, mirror overlaying module 262, mirror erasing module 264, and blending module 266 may each be configured to manipulate partially-manipulated original tile graphical object content 269 as described above with respect to oriented original tile graphical object content 229, but with respect to a second one of the multiple directions identified by the orientation content of oriented original tile graphical object content 229, so as to eventually provide additionally manipulated blended graphical object content 267a to finalizing module 268.

Finalizing module 268 may be configured to determine whether additionally manipulated blended graphical object content 267a may be manipulated once again with respect to yet another one of the multiple directions identified by the orientation content of oriented original tile graphical object content 229. If so, finalizing module 268 may pass additionally manipulated blended graphical object content 267a on to mirror generating module 260 as partially-manipulated original tile graphical object content 269 to begin the manipulation process once again, but this time with respect to yet another one of the multiple directions identified by the orientation content of oriented original tile graphical object content 229. However, if finalizing module 268 determines that additionally blended graphical object content 267a may not be manipulated once again with respect to yet another one of the multiple directions identified by the orientation content of oriented original tile graphical object content 229, finalizing module 268 may finalize additionally blended graphical object content 267a as manipulated original tile graphical object content 239 for patterning.

In other embodiments, rather than manipulating oriented original tile graphical object content 229 with respect to a single direction identified by the orientation content of oriented original tile graphical object content 229 before repeating the process for another direction, mirror generating module 260, mirror overlaying module 262, mirror erasing module 264, and blending module 266 may each be configured to manipulate oriented original tile graphical object content 229 with respect to some or all of the directions identified by the orientation content of oriented original tile graphical object content 229 at the same time.

This may ensure that finalizing module 268 may finalize received graphical object content 267 as manipulated original tile graphical object content 239 without having to pass received graphical object content 267 as partially-manipulated original tile graphical object content 269 on to mirror generating module 260 for additional manipulation.

As shown in FIG. 2, for example, graphical object processing module 250 may be configured to receive and process any of the graphical object content generated by graphical object manipulating module 230 (e.g., mirrored original tile graphical object content 261, superimposed mirrored original tile graphical object content 263, partially-erased superimposed mirrored original tile graphical object content 265, blended graphical object content 267/267a, and/or manipulated original tile graphical object content 239), such that graphical object content may be presented to a user on display 112 of device 100 during any phase of the manipulation process. In some embodiments, graphical object processing module 250 may be configured to render or otherwise process any received graphical object content (e.g., manipulated original tile graphical object content 239), and may therefore be configured to provide processed graphical object data for presentation on display 112 (e.g., processed graphical object data 259 based on the graphical object content provided to graphical object processing module 250 by graphical object manipulating module 230).

As shown in FIG. 2, for example, graphical display system 201 may also include a graphical object mapping module 240 that may be utilized to map a manipulated original tile in a pattern along a layer of a virtual canvas. For example, graphical object mapping module 240 may receive manipulated original tile graphical object content 239 and may map manipulated original tile graphical object content 239 to generate mapped manipulated original tile graphical object content 249. Such mapped manipulated original tile graphical object content 249 may define the graphical object content of a single manipulated original tile patterned on a layer of a virtual canvas.

As also shown in FIG. 2, graphical object mapping module 240 may receive graphical object mapping information 241 from various input sources for defining one or more characteristics with which manipulated original tile graphical object content 239 may be mapped. For example, such input sources may be the one or more applications being run by electronic device 100 and/or any user input instructions being received by device 100 (e.g., via input component 110, as shown in FIG. 2). In some embodiments, based on at least a portion of the received graphical object mapping information 241, graphical object mapping module 240 may be configured to map the manipulated original tile defined by manipulated original tile graphical object content 239 in one or more particular ways.

Graphical object mapping module 240 may be configured to map received manipulated original tile graphical object content 239 in any suitable way for generating mapped manipulated original tile graphical object content 249. For example, graphical object mapping module 240 may be configured to pin an initial manipulated tile defined by manipulated original tile graphical object content 239 at a particular initial position on a layer of a virtual canvas, and then to pattern a copy of that initial manipulated tile in one or more directions away from the initial manipulated tile along the layer of the virtual canvas. The particular initial position at which the initial manipulated tile may be pinned by graphical object mapping module 240 may be based on graphical object mapping information 241 provided by a user or an application of device 100. The one or more directions in which a copy of the initial manipulated tile may be patterned by graphical object mapping module 240 may be based on graphical object mapping information 241 provided by a user or an application of device 100 and/or based on the orientation content of oriented original tile graphical object content 229.

For example, as shown in FIG. 2, graphical object mapping module 240 may include a pinning module 242 and a patterning module 244. Pinning module 242 may be configured to receive manipulated original tile graphical object content 239 and to pin or otherwise position an initial manipulated tile defined by manipulated original tile graphical object content 239 at a particular initial position on a layer of a virtual canvas. Pinning module 242 may be configured to pin the initial manipulated tile at any suitable initial position on a layer of a virtual canvas. In some embodiments, the particular initial position at which the initial manipulated tile may be pinned by pinning module 242 may be based on graphical object mapping information 241 provided by a user or an application of device 100. For example, a user may choose the initial position by moving the initial manipulated tile to a desired position on the layer of a virtual canvas. Alternatively, an application of device 100 may determine the initial position on the layer of a virtual canvas based on any suitable criteria, such as the type or current settings of the application that may be provided with the layer as a background (e.g., Photo Booth™ by Apple Inc. or any other suitable application that may utilize a layer of graphical object data provided by a pattern of multiple instances of a single tile of graphical object data). Pinning module 242 may also be configured to pass the manipulated original tile graphical object content 239 of the initial manipulated tile, along with the particular initial position at which the initial manipulated tile may be pinned, on to any other portion of graphical display system 201 as pinned initial manipulated original tile graphical object content 243.

Patterning module 244 may be configured to receive pinned initial manipulated original tile graphical object content 243 and to pattern a copy of the initial manipulated tile defined by pinned initial manipulated original tile graphical object content 243 in one or more directions away from the initial manipulated tile along the layer of the virtual canvas. Patterning module 244 may be configured to pattern the initial manipulated tile in one or more suitable directions along the layer of the virtual canvas. In some embodiments, one or more directions in which a copy of the initial manipulated tile may be patterned by patterning module 244 may be based on graphical object mapping information 241 provided by a user or an application of device 100. For example, a user may choose such a direction by dragging a copy of the initial manipulated tile away from the pinned initial manipulated tile in a desired direction across the layer of a virtual canvas. Alternatively or additionally, an application of device 100 may determine at least one such direction based on any suitable criteria, such as the type or current settings of the application that may be provided with the layer as a background (e.g., Photo Booth™ by Apple Inc. or any other suitable application that may utilize a layer of graphical object data provided by a pattern of multiple instances of a single tile of graphical object data). Alternatively or additionally, one or more directions in which a copy of the initial manipulated tile may be patterned by patterning module 244 may be based on the orientation content of oriented original tile graphical object content 229. Patterning module 244 may also be configured to pass manipulated original tile graphical object content 239 of the initial manipulated tile and the particular initial position at which the initial manipulated tile may be pinned, as defined by pinned initial manipulated original tile graphical object content 243, along with the copy of the initial manipulated tile and the one or more directions in which the copy is to be mapped along the layer of the virtual canvas, on to any other portion of graphical display system 201 as mapped manipulated original tile graphical object content 249.

As shown in FIG. 2, for example, graphical object processing module 250 may be configured to receive and process any of the graphical object content generated by graphical object mapping module 240 (e.g., pinned initial manipulated original tile graphical object content 243 and/or mapped manipulated original tile graphical object content 249), such that graphical object content of an initial manipulated tile and/or of a patterned copy of an initial manipulated tile may be presented to a user on display 112 of device 100 during any phase of the mapping process. In some embodiments, graphical object processing module 250 may be configured to render or otherwise process any received graphical object content (e.g., mapped manipulated original tile graphical object content 249), and may therefore be configured to provide processed graphical object data for presentation on display 112 (e.g., processed graphical object data 259 based on the graphical object content provided to graphical object processing module 250 by graphical object mapping module 240).

In some embodiments, the graphical object content provided to one or more of the modules of system 201 may not be generated by another module of system 201, but instead that graphical object content may be accessible to system 201 from any other suitable source. For example, certain graphical object content that may be utilized by one or more of the various modules of system 201 may be pre-stored in memory 104 or otherwise accessible to an application running on device 100. As shown in FIG. 2, for example, rather than generating content 219 with module 210, system 201 may access content 219 from any suitable content source 124. Similarly, rather than generating content 229 with module 220, system 201 may access content 229 from any suitable content source 124. Likewise, rather than generating content 239 with module 230, system 201 may access content 239 from any suitable content source 124. For example, content source 124 may be application data that may have been previously generated by a developer of an application that may currently be running on device 100 (e.g., a graphics editing application or any other application mentioned herein). Therefore, while one, some, or all of the modules of system 201 may be utilized as an authoring tool for creating, editing, and/or manipulating a tile of graphical object content for mapping in a pattern, system 201 may additionally or alternatively be used as an automatic tile manipulating and/or mapping system that can access pre-defined tile content for manipulation and/or pre-defined tile content for mapping.

An illustrative example of how graphical display system 201 may generate and/or display tiles of graphical object content to a user may be described with reference to FIGS. 3A-3O.

Figure 3B:
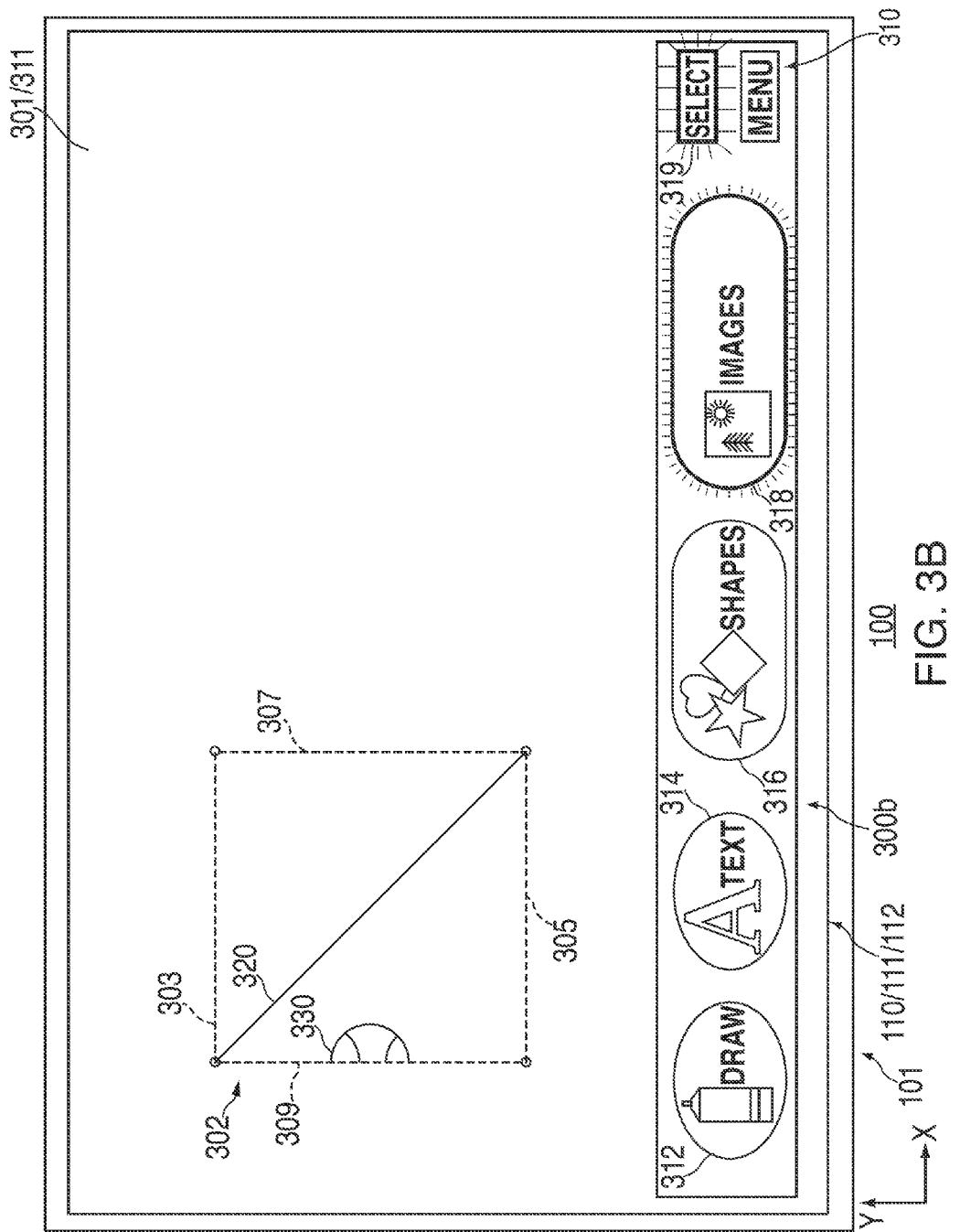
FIGS. 3A-3O are front views of the electronic device of FIGS. 1 and 2, presenting exemplary screens of displayed graphical data, in accordance with some embodiments of the invention.
Figure 3C:
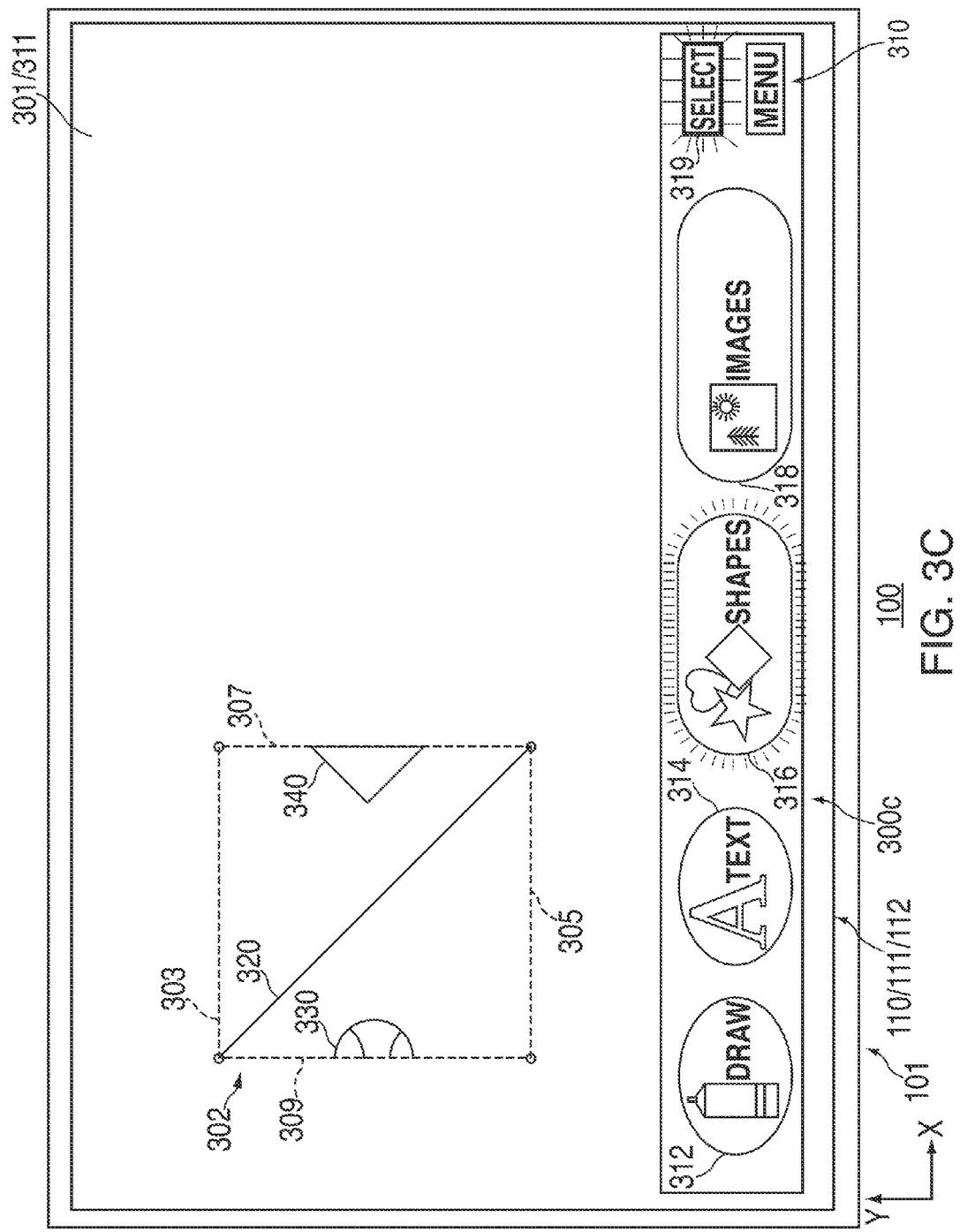
Figure 3D:
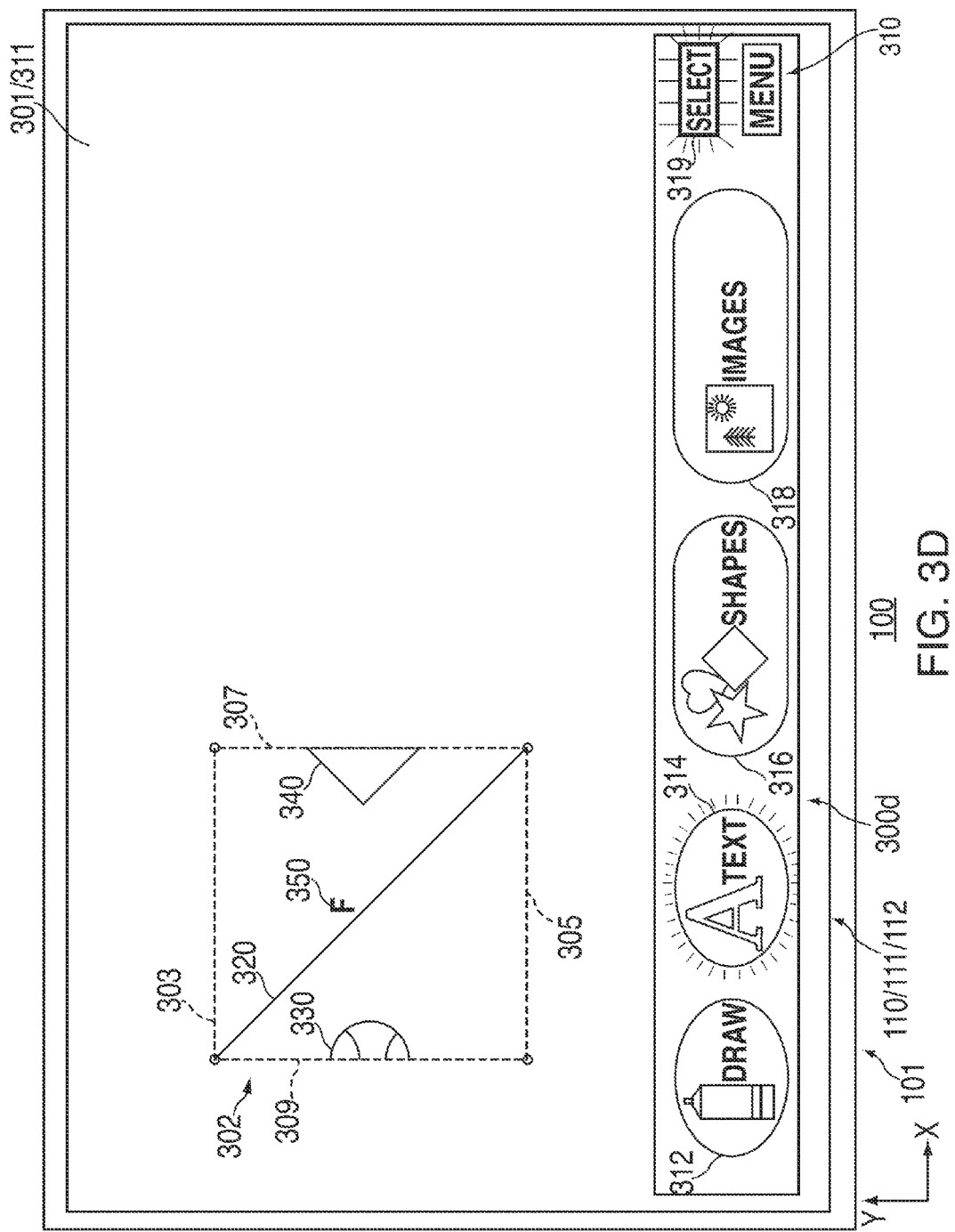
Figure 3E:
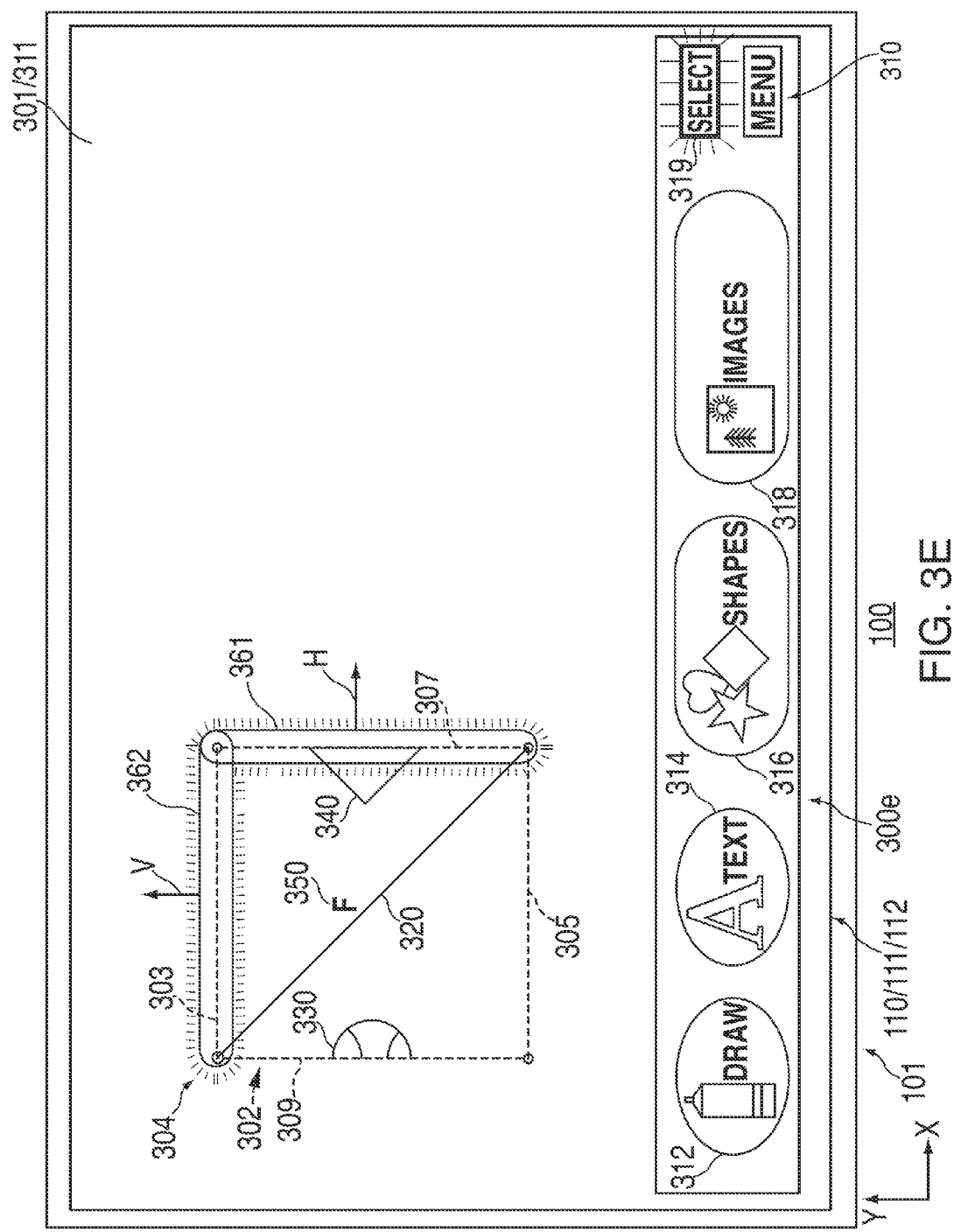
Figure 3F:
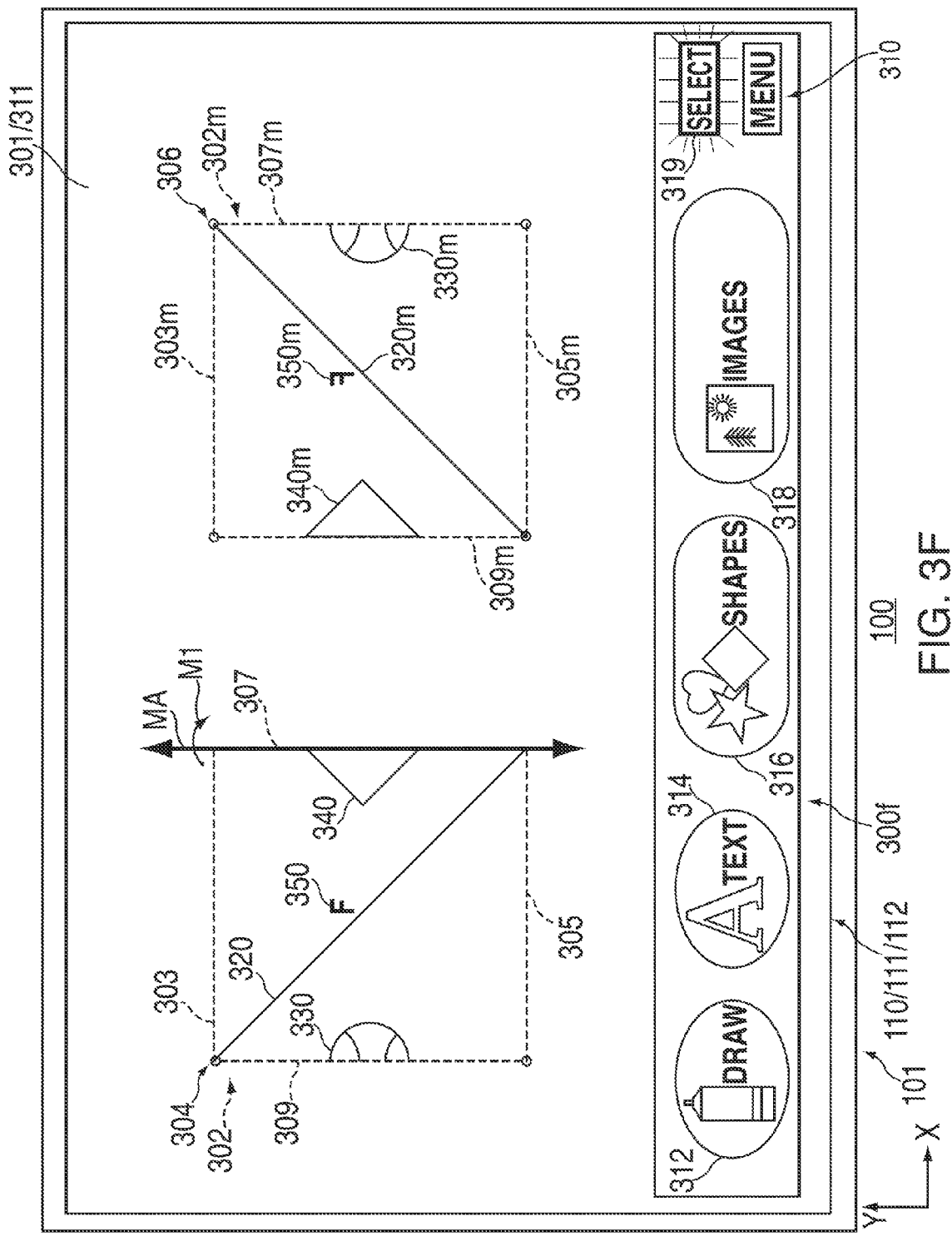
Figure 3G:
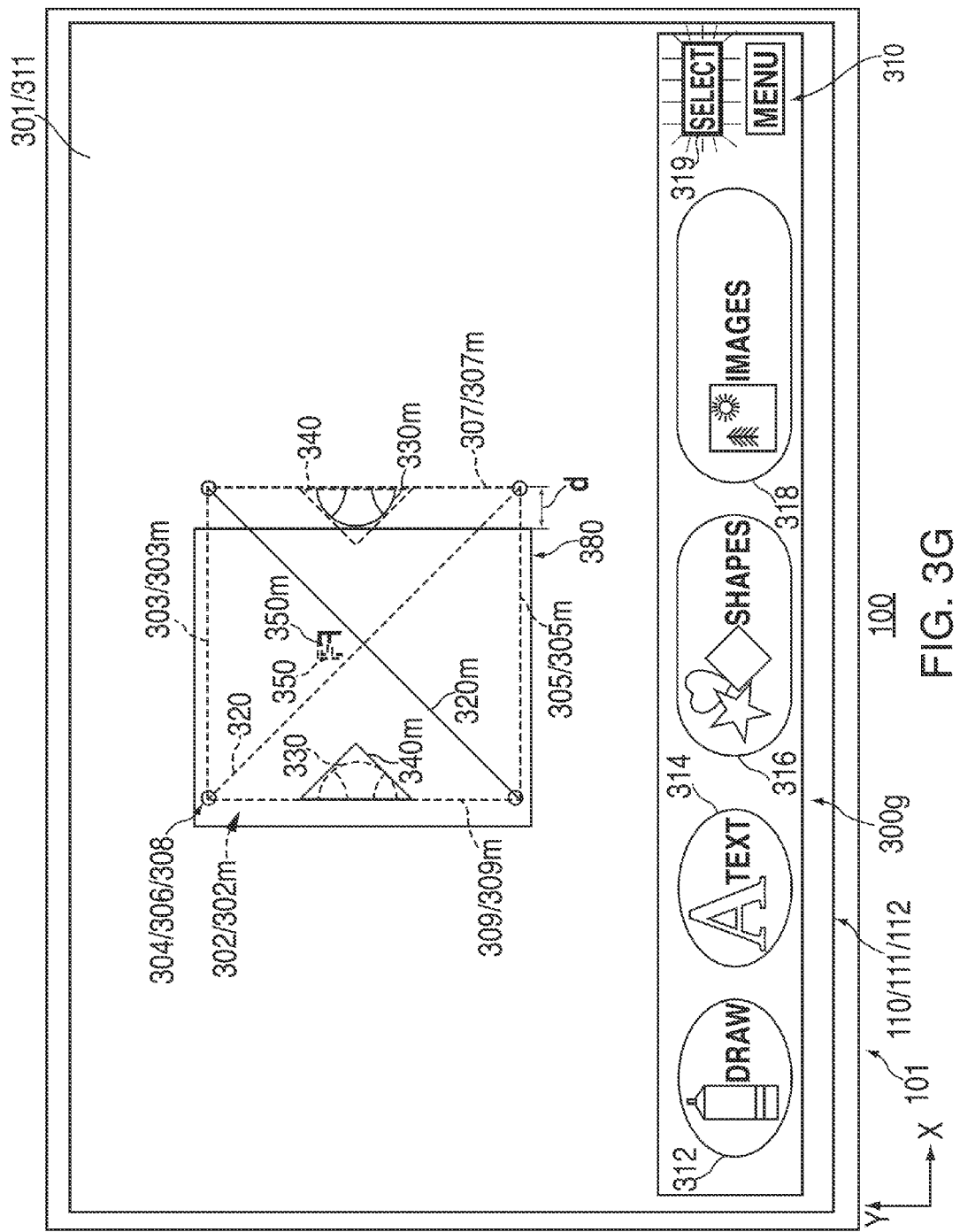
Figure 3H:
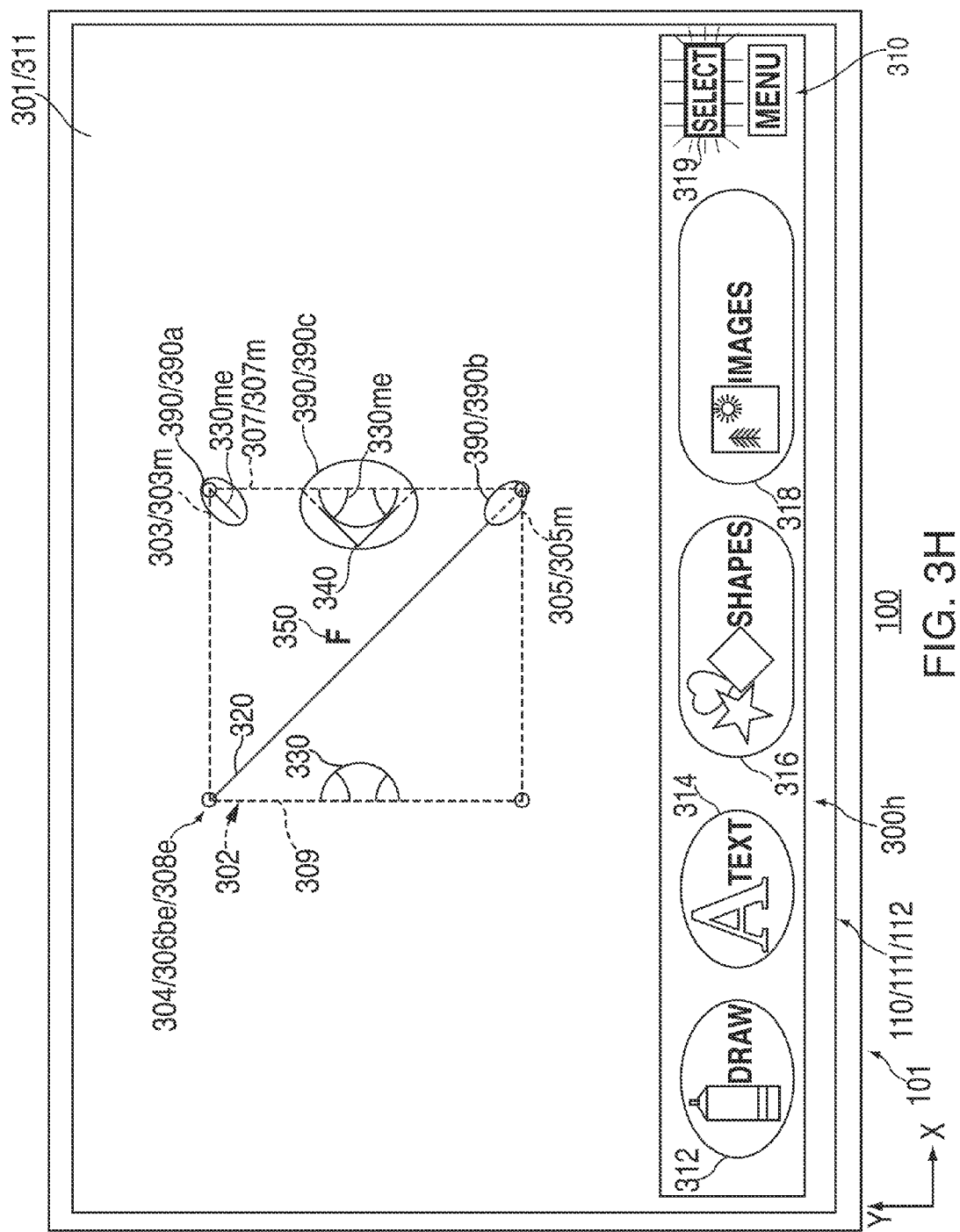
Figure 3I:
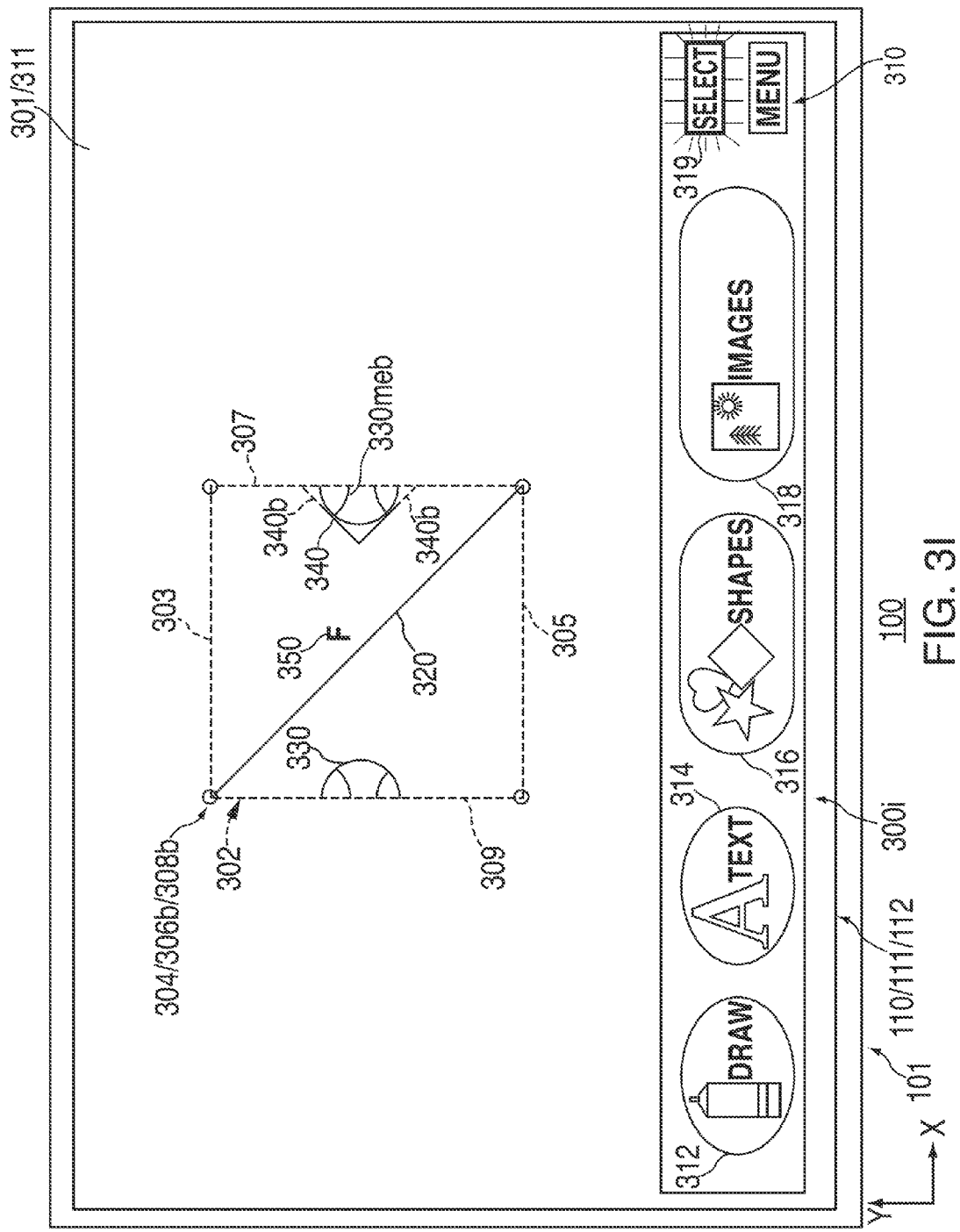
Figure 3J:
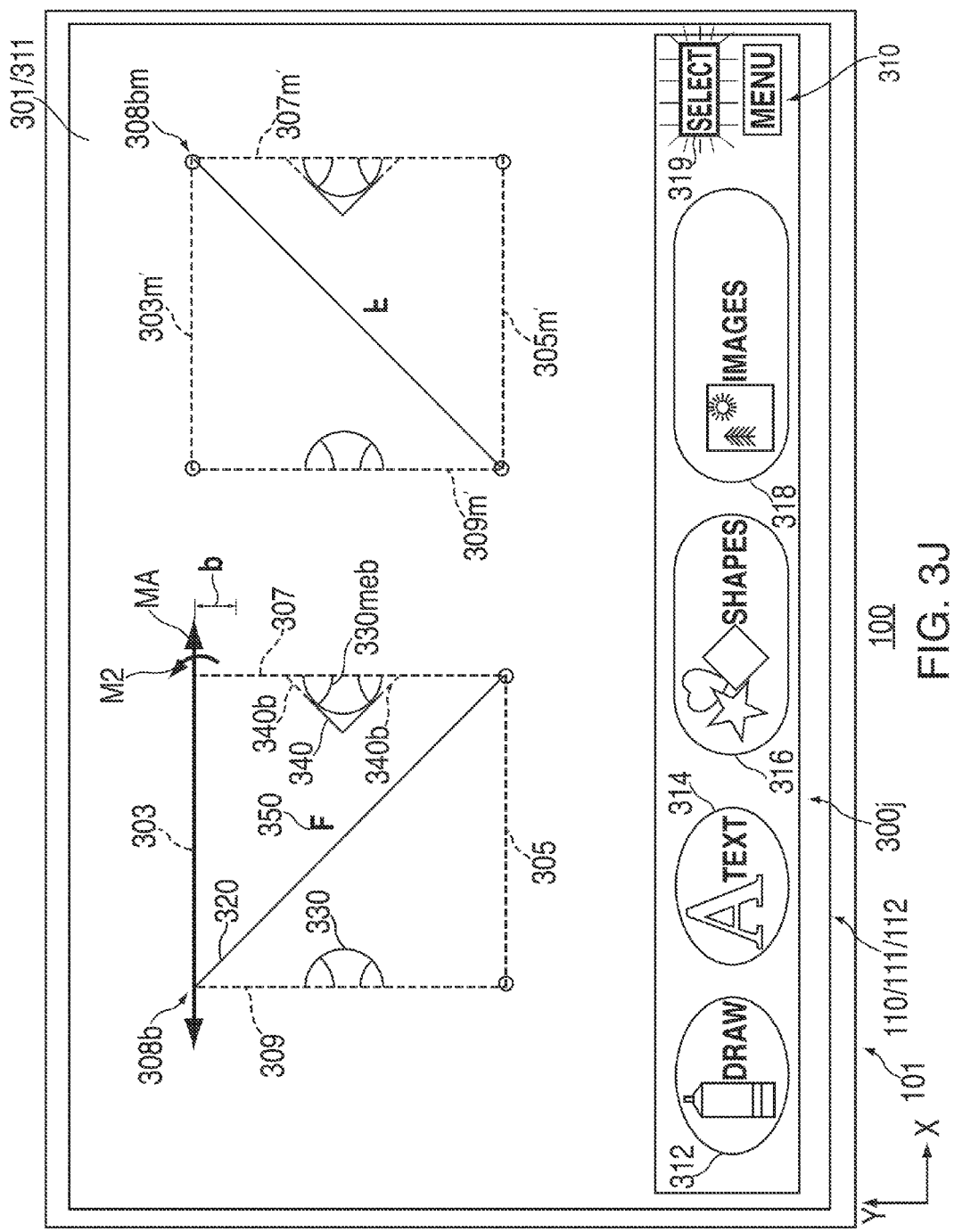
Figure 3K:
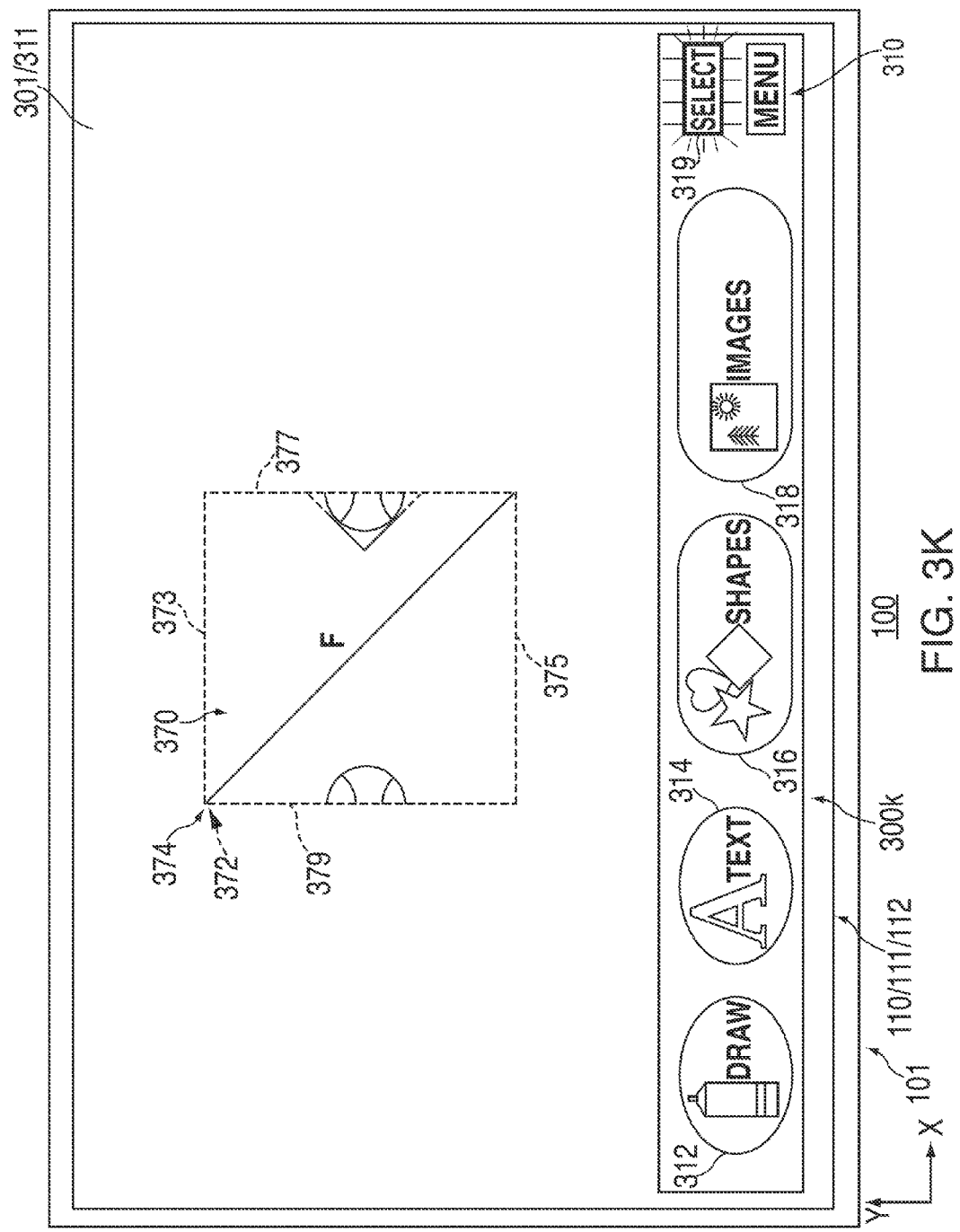
Figure 3L:
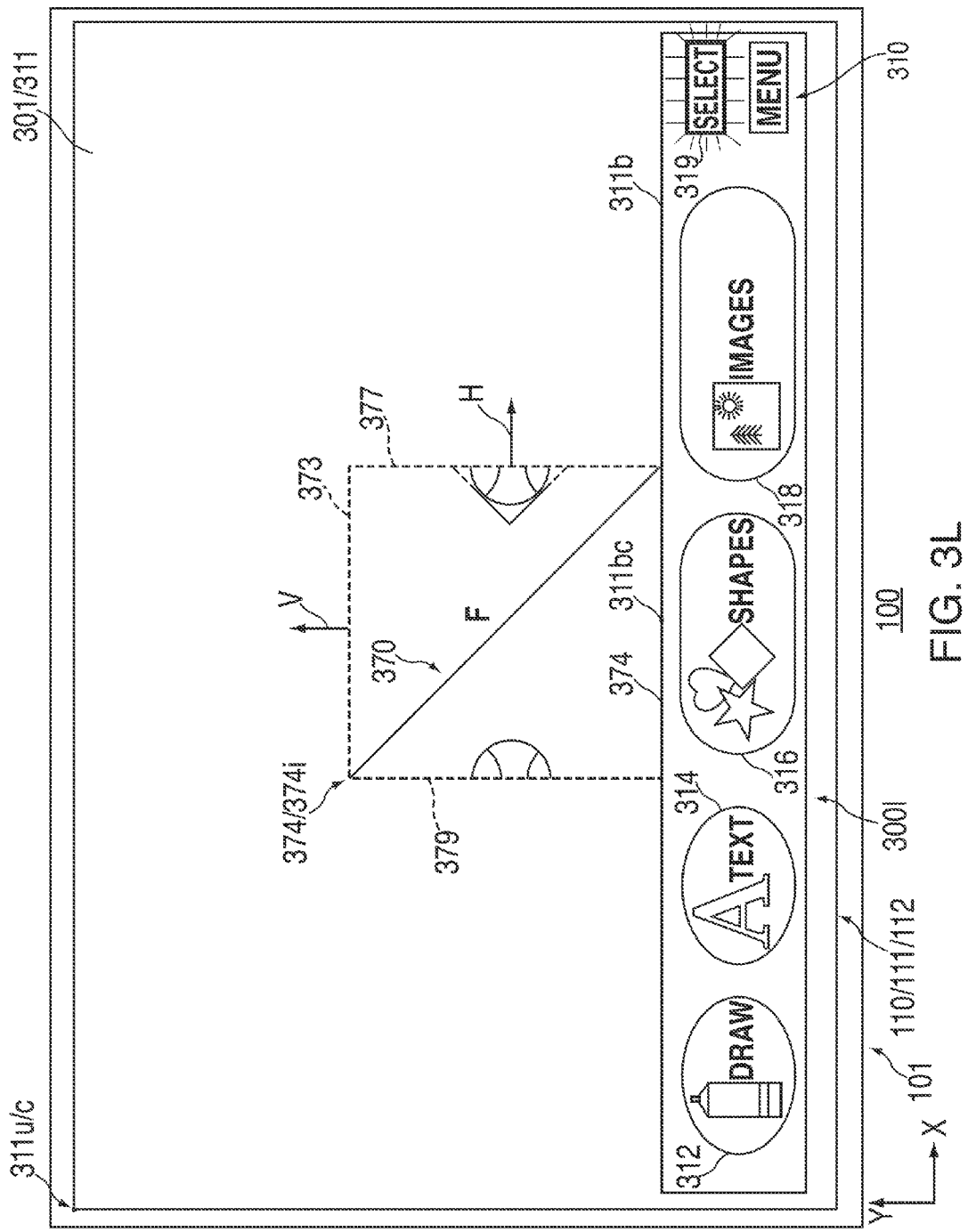
Figure 3M:
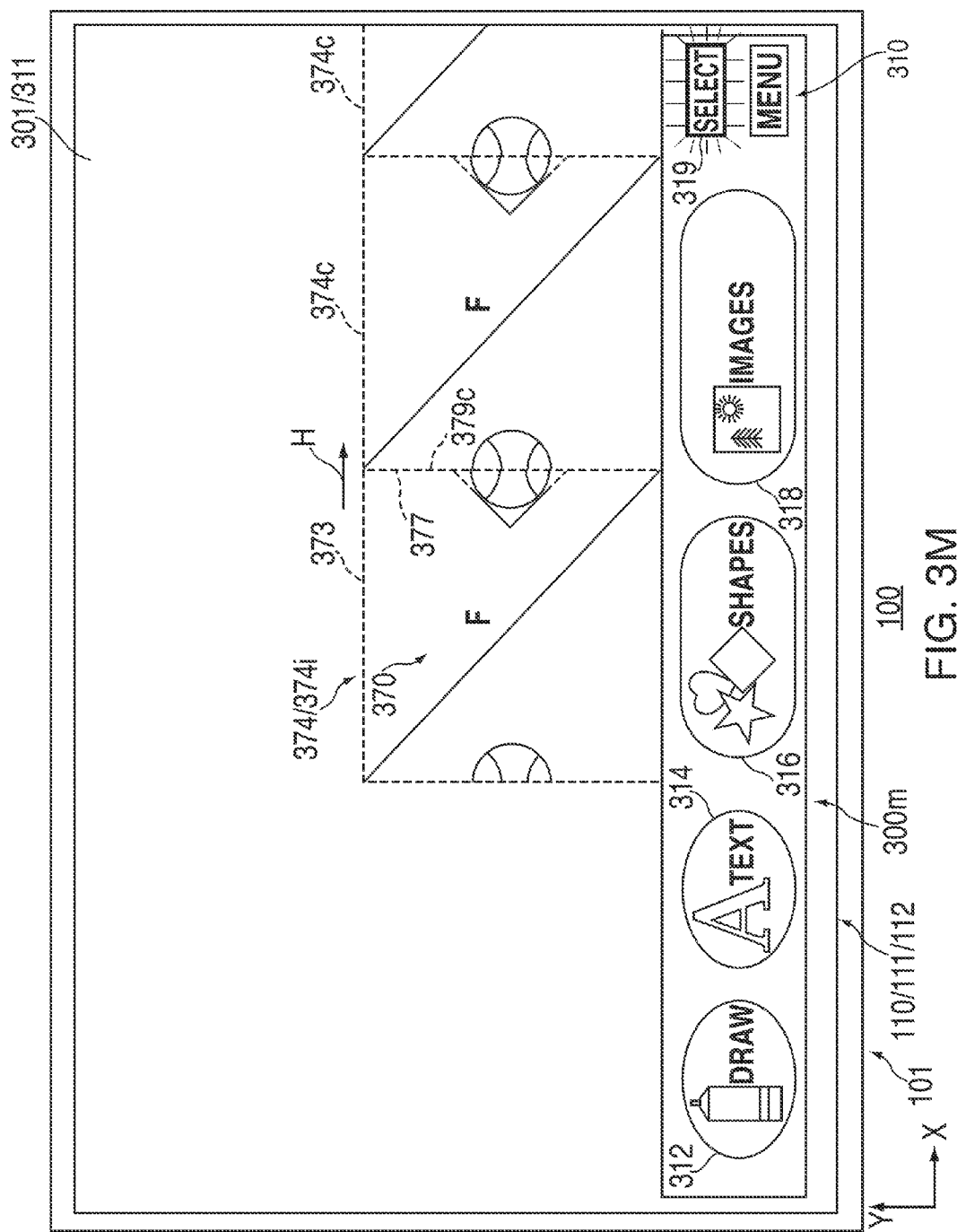
Figure 3N:
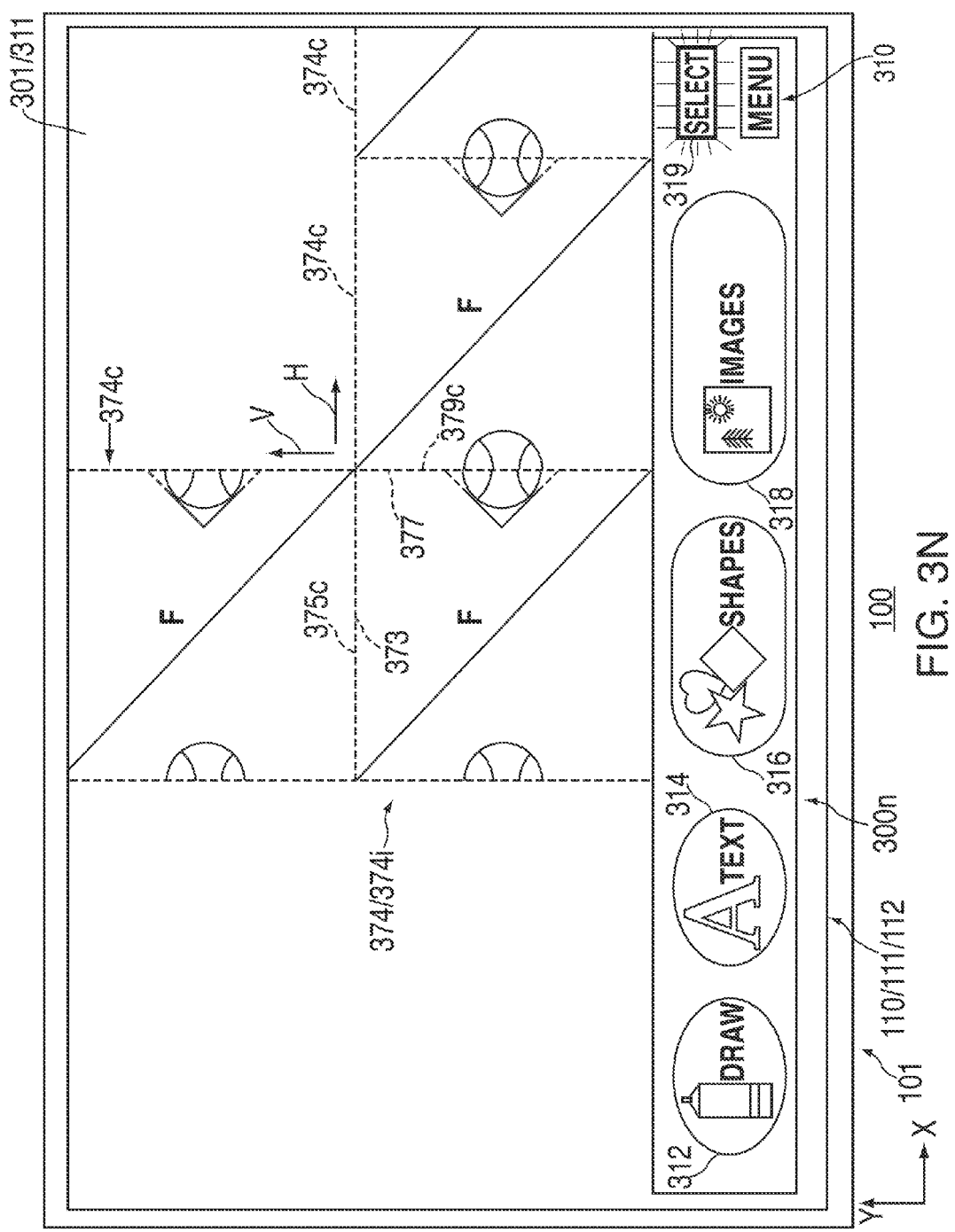
Figure 3O:
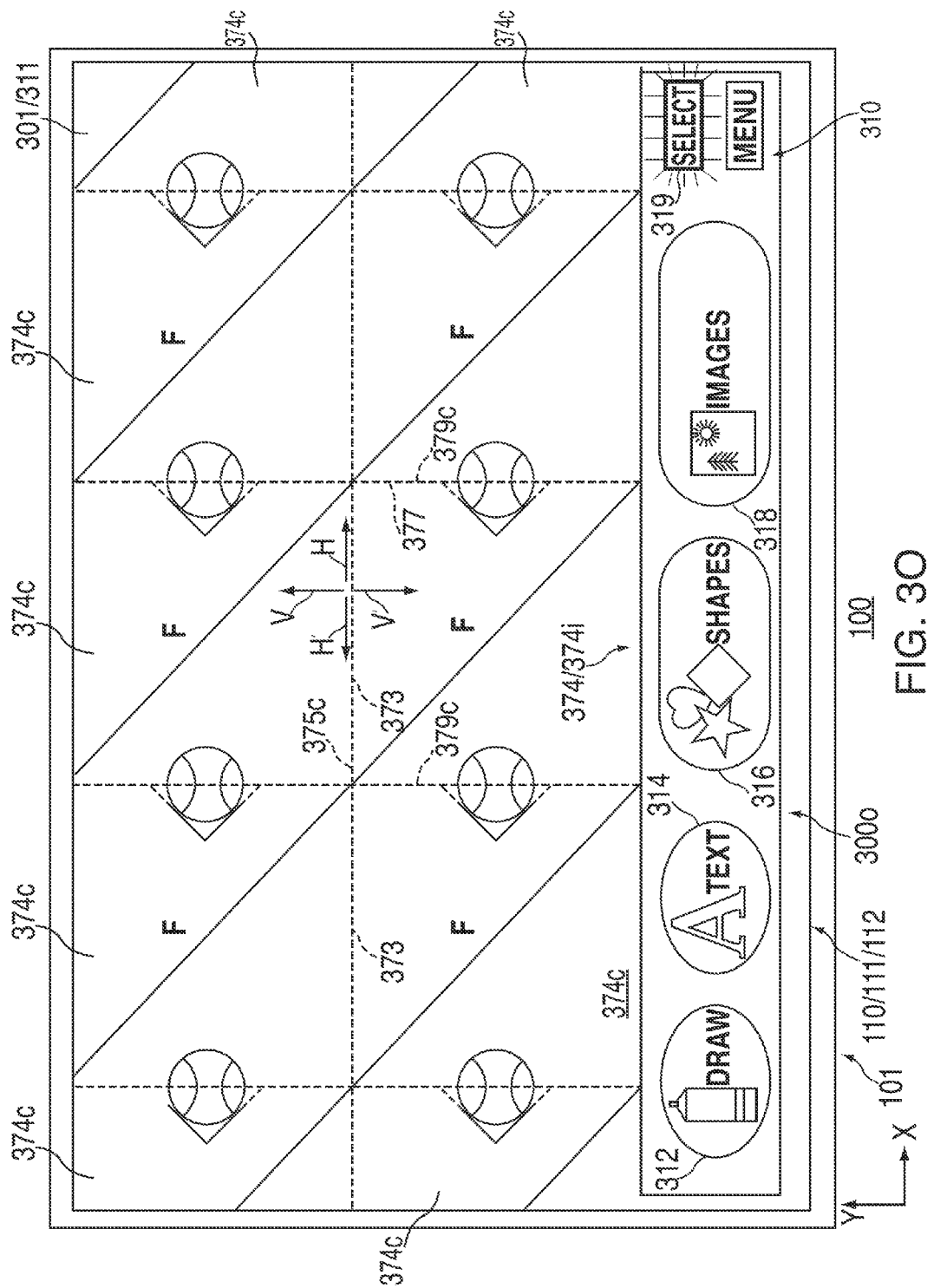

FIGS. 3A-3O, for example, show electronic device 100 with housing 101 and display 112 presenting respective exemplary screens 300a-300o of visual information. As shown, display 112 may be combined with input component 110 to provide an I/O interface component 111, such as a touch screen. At least a portion of the visual information of each one of screens 300a-300o may be generated by graphical object generating module 210, graphical object orienting module 220, graphical object manipulating module 230, and/or graphical object mapping module 240 of graphical display system 201 and processed by graphical object processing module 250 of graphical display system 201. As shown, screens 300a-300o may present an interface for a virtual drawing space application of device 100, with which a user may create and/or manipulate a tile of graphical object content to be mapped in a pattern (e.g., a virtual drawing space application that may be similar to that of Photoshop™ by Adobe Systems Incorporated or Microsoft Paint™ by Microsoft Corporation). It is to be understood, however, that screens 300a-300o are merely exemplary, and display 112 may present any images representing any type of graphical objects and/or graphical object animation that may be generated and processed by graphical display system 201.

For example, as shown in FIGS. 3A-3O, a virtual drawing space application may provide a canvas area 301 on a portion of the screen in which various graphical objects may be presented. Canvas 301 may be a virtual drawing workspace portion of the screen in which pixel data may be created and manipulated for creating and/or manipulating a tile to be patterned. In some embodiments, canvas 301 may include an initial canvas background layer 311. For example, whenever a virtual drawing space application of device 100 is initially loaded for creating, editing, and/or manipulating a tile of graphical object content, canvas background layer 311 may be automatically defined and generated. The size of canvas background layer 311 may be configured to span the entire area of canvas 301. In some embodiments, the size of canvas 301 and, thus, canvas background layer 311, may dynamically change in response to various graphical objects that may be positioned on canvas 301, such that canvas 301 may always be large enough to contain whatever is created on canvas 301. The color of the pixels of canvas back ground layer 311 may all be defined as white (e.g., such that canvas 301 may appear as a blank slate), although any other suitable color or pattern of colors may be used to define the pixels of canvas background layer 311.

A virtual drawing space application may provide a blank tile outline 302 on background layer 311 within which one or more various graphical objects may be created, edited, and/or manipulated. For example, whenever a virtual drawing space application of device 100 is initially loaded for creating, editing, and/or manipulating a tile of graphical object content, blank tile outline 302 may be automatically defined and generated. The initial size and shape of blank tile outline 302 may be configured in any suitable way, but may be dynamically changed in response to various user inputs. For example, as shown in FIG. 3A, blank tile outline 302 may be provided as a square with a top side 303, a bottom side 305 opposite top side 303, a right side 307, and a left side 309 opposite right side 307. A user may interact with the application to adjust the size of any one or more of the sides of blank tile outline 302 and/or to adjust the shape of blank tile outline 302.

The virtual drawing space application may also provide on a portion of the screen at least one artist menu 310. Menu 310 may include one or more graphical input options that a user may choose from to access various tools and functionalities of the application that may then be utilized by the user to create various types of graphical objects within tile outline 302. Menu 310 may provide one or more toolbars, toolboxes, palettes, buttons, or any other suitable user interface menus.

As shown in FIGS. 3A-3O, for example, artist menu 310 may include a free-form drawing stroke or drawing tool input option 312, which a user may select for creating free-form drawing strokes within tile outline 302 (e.g., by repeatedly applying a stamp of a user-controlled virtual input drawing tool along a stroke trail within tile outline 302). Artist menu 310 may also include a text string input option 314, which a user may select for creating strings of characters within tile outline 302. Artist menu 310 may also include a drawing shape input option 316, which a user may select for creating various drawing shapes within tile outline 302. Moreover, artist menu 310 may also include an image input option 318, which a user may select for importing video-based or photographic images into tile outline 302. In some embodiments, artist menu 310 may also include a content selection option 319, which a user may select for identifying a particular portion of displayed content in canvas 301 that the user may wish to manipulate in some way (e.g., to manipulate the size or shape of tile outline 302). It is to be understood, however, that options 312-319 of artist menu 310 are merely exemplary, and a virtual drawing space application may provide various other types of options that a user may work with for creating, editing, and/or manipulating content within tile outline 302.

As shown by screen 300a of FIG. 3A, for example, a user may select drawing tool input option 312 of artist menu 310 for creating one or more free-form drawing strokes within tile outline 302. In some embodiments, when a user selects drawing tool input option 312, menu 310 may reveal one or more sub-menus (not shown) that can provide the user with one or more different types of pre-defined drawing stroke input tools or various other drawing stroke properties that may be selected for helping the user define a particular drawing stroke graphical object to be presented within tile outline 302. When drawing tool input option 312 is selected, device 100 may be configured to allow a user to selectively generate one or more drawing strokes within tile outline 302 using any suitable sub-menus provided by menu 310 and/or using any other suitable input gestures with any suitable input component 110 available to the user, such as a mouse input component or a touch input component (e.g., touch screen 111).

Once a user has indicated he or she wants to generate a drawing stroke graphical object (e.g., once drawing tool input option 312 has been selected), certain menu selections or other input gestures made by the user may be received by graphical display system 201 for generating and displaying a drawing stroke graphical object within tile outline 302. For example, such menu selections and other input gestures made by the user may be received by graphical object generating module 210 as drawing stroke graphical object input information 211 for creating a new drawing stroke graphical object.

Based on any appropriate drawing stroke graphical object input information 211, which may be generated by a user or any application running on device 100, graphical object generating module 210 may be configured to define and generate at least one new drawing stroke graphical object. For example, graphical object generating module 210 may generate original tile drawing stroke graphical object content 219. This original tile drawing stroke graphical object content 219 may then be processed by graphical object processing module 250 as processed graphical object data 259 (e.g., processed original tile drawing stroke graphical object data) and presented on display 112.

For example, as shown in FIG. 3A, this processed original tile drawing stroke graphical object data may be presented on canvas 301 within tile outline 302 of screen 300a as an original tile drawing stroke graphical object 320. Original tile drawing stroke graphical object 320 may be any suitable collection of one or more suitable drawing strokes within tile outline 302. For example, as shown in FIG. 3A, original tile drawing stroke graphical object 320 may include a diagonal line extending from the top-left corner to the bottom-right corner of tile outline 302.

At some point, graphical display system 201 may receive new graphical object input information 211 that may be indicative of another type of graphical object (i.e., a graphical object type other than a drawing stroke graphical object). For example, as shown by screen 300b of FIG. 3B, a user may select image input option 318 of artist menu 310 for creating one or more image graphical objects within tile outline 302. In some embodiments, when a user selects image input option 318, menu 310 may reveal one or more sub-menus (not shown) that can provide the user with one or more ways in which a user can identify a particular image file of image content to be added within tile outline 302. When image input option 318 is selected, device 100 may be configured to allow a user to selectively generate an image graphical object within tile outline 302 using any suitable sub-menus provided by menu 310 and/or using any other suitable input gestures with any suitable input component 110 available to the user, such as a mouse input component or a touch input component (e.g., touch screen 111).

Once a user has indicated he or she wants to generate an image graphical object (e.g., once image input option 318 has been selected), certain menu selections or other input gestures made by the user may be received by graphical display system 201 for generating and displaying an image graphical object within tile outline 302. For example, such menu selections and other input gestures made by the user may be received by graphical object generating module 210 as image graphical object input information 211 for creating a new image graphical object.

Based on any appropriate image graphical object input information 211, which may be generated by a user or any application running on device 100, graphical object generating module 210 may be configured to define and generate at least one new image graphical object. For example, graphical object generating module 210 may generate original tile image graphical object content 219. This original tile image graphical object content 219 may then be processed by graphical object processing module 250 as processed graphical object data 259 (e.g., processed original tile image graphical object data) and presented on display 112.

For example, as shown in FIG. 3B, this processed original tile image graphical object data may be presented on canvas 301 within tile outline 302 of screen 300b as an original tile image graphical object 330. Original tile image graphical object 330 may be any suitable collection of one or more images within tile outline 302. For example, as shown in FIG. 3B, original tile image graphical object 330 may include an image of half a baseball. Original tile image graphical object 330 may be positioned within tile outline 302 to have any suitable relationship with any other graphical objects positioned within tile outline 302. For example, as shown in FIG. 3B, original tile image graphical object 330 may be positioned at left side 309 of tile outline 302 (e.g., the original image graphical object may have been a complete baseball that was positioned so as to be intersected by left side 309, such that only the right half of the complete baseball may be provided within tile outline 302). In other embodiments, original tile image graphical object 330 may be positioned to have any other suitable relationship with any side of tile outline 302 and/or original tile drawing stroke graphical object 320, including overlapping drawing stroke graphical object 320.

At some point, graphical display system 201 may receive new graphical object input information 211 that may be indicative of another type of graphical object (i.e., a graphical object type other than a drawing stroke graphical object or an image graphical object). For example, as shown by screen 300c of FIG. 3C, a user may select drawing shape input option 316 of artist menu 310 for creating one or more drawing shape graphical objects within tile outline 302. In some embodiments, when a user selects drawing shape input option 316, menu 310 may reveal one or more sub-menus (not shown) that can provide the user with one or more ways in which a user can identify a particular shape to be added within tile outline 302. When drawing shape input option 316 is selected, device 100 may be configured to allow a user to selectively generate a drawing shape graphical object within tile outline 302 using any suitable sub-menus provided by menu 310 and/or using any other suitable input gestures with any suitable input component 110 available to the user, such as a mouse input component or a touch input component (e.g., touch screen 111).

Once a user has indicated he or she wants to generate a drawing shape graphical object (e.g., once drawing shape input option 316 has been selected), certain menu selections or other input gestures made by the user may be received by graphical display system 201 for generating and displaying a drawing shape graphical object within tile outline 302. For example, such menu selections and other input gestures made by the user may be received by graphical object generating module 210 as drawing shape graphical object input information 211 for creating a new drawing shape graphical object.

Based on any appropriate drawing shape graphical object input information 211, which may be generated by a user or any application running on device 100, graphical object generating module 210 may be configured to define and generate at least one new drawing shape graphical object. For example, graphical object generating module 210 may generate original tile drawing shape graphical object content 219. This original tile drawing shape graphical object content 219 may then be processed by graphical object processing module 250 as processed graphical object data 259 (e.g., processed original tile drawing shape graphical object data) and presented on display 112.

For example, as shown in FIG. 3C, this processed original tile drawing shape graphical object data may be presented on canvas 301 within tile outline 302 of screen 300c as an original tile drawing shape graphical object 340. Original tile drawing shape graphical object 340 may be any suitable collection of one or more drawing shapes within tile outline 302. For example, as shown in FIG. 3C, original tile drawing shape graphical object 340 may include a triangle shape. Original tile drawing shape graphical object 340 may be positioned within tile outline 302 to have any suitable relationship with any other graphical objects positioned within tile outline 302. For example, as shown in FIG. 3C, original tile drawing shape graphical object 340 may be positioned against right side 307. In other embodiments, original tile drawing shape graphical object 340 may be positioned to have any other suitable relationship with any side of tile outline 302 and/or with original tile drawing stroke graphical object 320 and/or with original tile image graphical object 330, including overlapping drawing stroke graphical object 320 and/or image graphical object 330.

At some point, graphical display system 201 may receive new graphical object input information 211 that may be indicative of another type of graphical object (i.e., a graphical object type other than a drawing stroke graphical object, an image graphical object, or a drawing shape graphical object). For example, as shown by screen 300d of FIG. 3D, a user may select text string input option 314 of artist menu 310 for creating one or more text string graphical objects within tile outline 302. In some embodiments, when a user selects text string input option 314, menu 310 may reveal one or more sub-menus (not shown) that can provide the user with one or more ways in which a user can identify a particular text string to be added within tile outline 302. When text string input option 314 is selected, device 100 may be configured to allow a user to selectively generate a text string graphical object within tile outline 302 using any suitable sub-menus provided by menu 310 and/or using any other suitable input gestures with any suitable input component 110 available to the user, such as a mouse input component or a touch input component (e.g., touch screen 111).

Once a user has indicated he or she wants to generate a text string graphical object (e.g., once text string input option 314 has been selected), certain menu selections or other input gestures made by the user may be received by graphical display system 201 for generating and displaying a text string graphical object within tile outline 302. For example, such menu selections and other input gestures made by the user may be received by graphical object generating module 210 as text string graphical object input information 211 for creating a new text string graphical object.

Based on any appropriate text string graphical object input information 211, which may be generated by a user or any application running on device 100, graphical object generating module 210 may be configured to define and generate at least one new text string graphical object. For example, graphical object generating module 210 may generate original tile text string graphical object content 219. This original tile text string graphical object content 219 may then be processed by graphical object processing module 250 as processed graphical object data 259 (e.g., processed original tile text string graphical object data) and presented on display 112.

For example, as shown in FIG. 3D, this processed original tile text string graphical object data may be presented on canvas 301 within tile outline 302 of screen 300d as an original tile text string graphical object 350. Original tile text string graphical object 350 may be any suitable collection of one or more text strings within tile outline 302. For example, as shown in FIG. 3D, original tile text string graphical object 350 may include an "F" character. Original tile text string graphical object 350 may be positioned within tile outline 302 to have any suitable relationship with any other graphical objects positioned within tile outline 302. For example, as shown in FIG. 3D, original tile text string graphical object 350 may be positioned between top side 303 and drawing stroke graphical object 320. In other embodiments, original tile text string graphical object 350 may be positioned to have any other suitable relationship with original tile drawing stroke graphical object 320, with original tile image graphical object 330, and/or with drawing shape graphical object 340, including overlapping.

At some point, graphical display system 201 may receive new graphical object input information 211 that may be indicative of the fact that no additional graphical object content is to be added or edited within tile outline 302 and that the graphical object content of the original tile is complete. For example, as shown by screen 300e of FIG. 3E, each graphical object input option of artist menu 310 may be unselected, but content selection option 319 may remain selected, which may be indicative of the fact that the original tile is complete. Therefore, graphical object generating module 210 may finalize original tile graphical object content 219 for processing and presentation by processing module 250 on display 112 as processed finalized original tile graphical object data, for example, such that the existing graphical object content provided within tile outline 302 (e.g., graphical objects 320, 330, 340, and 350) may be presented as a complete original tile 304 on canvas 301.

In some embodiments, when original tile graphical object content 219 is finalized and complete original tile 304 is presented on canvas 301, menu 310 may reveal one or more sub-menus (not shown) that can provide the user with one or more ways in which a user can define one or more directions in which complete original tile 304 is to be patterned. For example, device 100 may be configured to allow a user to selectively define one or more directions in which complete original tile 304 is to be patterned using any suitable sub-menus provided by menu 310 and/or using any other suitable input gestures with any suitable input component 110 available to the user, such as a mouse input component or a touch input component (e.g., touch screen 111).

Once a user has indicated that no additional graphical object content is to be added or edited within tile outline 302 and that the existing graphical object content is complete original tile 304, certain menu selections or other input gestures made by the user may be received by graphical display system 201 for defining one or more directions in which complete original tile 304 is to be patterned. For example, such menu selections and other input gestures made by the user may be received by graphical object orienting module 220 as graphical object orientation information 221 for defining one or more directions in which complete original tile 304 is to be patterned.

Based on any appropriate graphical object orientation information 221, which may be generated by a user or any application running on device 100, graphical object orienting module 220 may be configured to identify one or more sides of complete original tile 304 against which a copy of original tile 304 may be positioned for patterning original tile 304. Each one of such identified sides may be indicative of a respective direction along which original tile 304 may be patterned. For example, graphical object orienting module 220 may generate oriented original tile text string graphical object content 229. This oriented original tile text string graphical object content 229 may then be processed by graphical object processing module 250 as processed graphical object data 259 (e.g., processed oriented original tile graphical object data) and presented on display 112.

For example, as shown in FIG. 3E, this processed oriented original tile graphical object data may be presented on canvas 301 of screen 300e as a first highlighted identification 361 of right side 307 of complete original tile 304. Highlighted identification 361 may be any suitable graphic or type of information generated by device 100 that may identify a first particular side of original tile 304 (e.g., right side 307), and thus a first particular direction along which original tile 304 may be patterned (e.g., in a horizontal direction). For example, as shown in FIG. 3E, highlighted identification 361 may be a highlighted outline of right side 307 of complete original tile 304. This may be indicative of the orientation content of oriented original tile graphical object content 229 defining a first horizontal direction in which original tile 304 may be patterned (e.g., the horizontal direction of arrow H of FIG. 3E). This direction of arrow H may be a direction that is perpendicular or normal to the identified right side 307 of original tile 304.

Additionally or alternatively, as also shown in FIG. 3E, this processed oriented original tile graphical object data may be presented on canvas 301 of screen 300e as a second highlighted identification 362 of top side 303 of complete original tile 304. Highlighted identification 362 may be any suitable graphic or type of information generated by device 100 that may identify a second particular side of original tile 304 (e.g., top side 303), and thus a second particular direction along which original tile 304 may be patterned (e.g., in a vertical direction). For example, as shown in FIG. 3E, highlighted identification 362 may be a highlighted outline of top side 303 of complete original tile 304. This may be indicative of the orientation content of oriented original tile graphical object content 229 defining a first vertical direction in which original tile 304 may be patterned (e.g., the vertical direction of arrow V of FIG. 3E). This direction of arrow V may be a direction that is perpendicular or normal to the identified top side 303 of original tile 304.

At some point, once suitable orientation content of oriented original tile graphical object content 229 has been generated by graphical object orienting module 220, graphical object orienting module 220 may provide finalized oriented original tile graphical object content 229 to graphical object manipulating module 230 for manipulating the graphical object content of a finalized and oriented original tile. For example, mirror generating module 260 of graphical object manipulating module 230 may be configured to receive oriented original tile graphical object content 229 and to generate mirrored original tile graphical object content 261.

As mentioned, mirror generating module 260 may be configured to generate a mirrored copy of the graphical object content of the original tile about or across any suitable mirror axis. In some embodiments, the mirror axis may be along any suitable side of the original tile. Therefore, for example, the mirror axis utilized by mirror generating module 260 to generate a mirrored copy of the graphical object content of oriented original tile graphical object content 229 may be an axis that runs along at least a portion of a side of the original tile identified by the orientation content of oriented original tile graphical object content 229 (i.e., one of right side 307 identified by highlighted identification 361 and top side 303 identified by highlighted identification 362). Mirror generating module 260 may also be configured to pass oriented original tile graphical object content 229 and the mirrored copy of the graphical object content of oriented original tile graphical object content 229 on to any other portion of graphical display system 201 as mirrored original tile graphical object content 261.

As shown by screen 300f of FIG. 3F, mirror generating module 260 may generate mirrored original tile graphical object content 261 about a mirror axis along identified right side 307 of original tile 304. Then mirror generating module 260 may pass this mirrored original tile graphical object content 261 on to processing module 250 for processing and presentation on display 112 as processed mirrored original tile graphical object content data, for example, such that a mirrored copy 306 of original tile 304 may be generated about right side 307 and presented on canvas 301. It is to be noted that, when oriented original tile graphical object content 229 identifies more than one side of original tile 304 that may be used by mirror generating module 260 to define a mirror axis, system 201 may be configured such that menu 310 may provide a user with one or more ways in which he or she can choose which of the identified sides of original tile 304 should define the mirror axis. For example, a mirror axis MA may be presented and moved by a user on screen 300*f* such that it may be positioned along one of identified sides 303 and 307 of original tile 304 (e.g., mirror axis MA may be positioned along identified right side 307 such that mirrored copy 306 may be generated and presented about right side 307 in the direction of arrow M1, as shown in FIG. 3F).

In some embodiments, when mirrored original tile graphical object content 261 is generated about identified right side 307 and mirrored copy 306 of complete original tile 304 is presented on canvas 301, original tile 304 may continue to be presented on canvas 301 (e.g., as shown in FIG. 3F). In other embodiments, when mirrored original tile graphical object content 261 is generated about identified right side 307 and mirrored copy 306 of complete original tile 304 is presented on canvas 301, only mirrored copy 306 may be presented on canvas 301 and original tile 304 may be removed from canvas 301. As shown in FIG. 3F, mirrored copy 306 may include mirrored graphical objects 320*m*, 330*m*, 340*m*, and 350*m* that may be mirrored copies of respective graphical objects 320, 330, 340, and 350 of original tile 304. Mirrored graphical objects 320*m*, 330*m*, 340*m*, and 350*m* may be provided within a mirrored tile outline 302*m*, and mirrored tile outline 302*m* may be provided with a mirrored top side 303*m*, a mirrored bottom side 305*m* opposite mirrored top side 303*m*, a mirrored right side 307*m*, and a mirrored left side 309*m* opposite mirrored right side 307*m*.

Once suitable mirrored original tile graphical object content 261 has been generated about a first mirror axis by mirror generating module 260, mirror generating module 260 may provide mirrored original tile graphical object content 261 to mirror overlaying module 262 for superimposing the graphical object content of the mirrored copy onto the original tile. For example, mirror overlaying module 262 of graphical object manipulating module 230 may be configured to receive mirrored original tile graphical object content 261 and to generate superimposed mirrored original tile graphical object content 263. As mentioned, mirror overlaying module 262 may be configured to overlay, superimpose, or otherwise place the mirrored copy of the original tile onto the original tile by aligning similar sides of the two tiles.

As shown by screen 300*g* of FIG. 3G, for example, mirror overlaying module 262 may generate superimposed mirrored original tile graphical object content 263. Then mirror overlaying module 260 may pass this superimposed mirrored original tile graphical object content 263 on to processing module 250 for processing and presentation on display 112 as processed superimposed mirrored original tile graphical object content data, for example, such that mirrored copy 306 may be superimposed on original tile 304 as a superimposed mirrored tile 308 that may be generated and presented on canvas 301. As shown in FIG. 3G, superimposed mirrored tile 308 may include mirrored copy 306 superimposed on original tile 304 by aligning tile outline 302 and mirrored tile outline 302*m* (e.g., such that top side 303 may align with mirrored top side 303*m*, bottom side 305 may align with mirrored bottom side 305*m*, right side 307 may align with mirrored right side 307*m*, and/or left side 309 may align with mirrored left side 309*m*). Although superimposed mirrored tile 308 may include mirrored copy 306 may be superimposed over original tile 304, device 100 may be configured in some embodiments such that superimposed mirrored tile 308 may present at least portions of original tile 304 on screen display 112. For example, as shown in FIG. 3G, device 100 may be configured such that superimposed mirrored tile 308 may present at least a portion of the graphical object content of original tile 304 underneath mirrored copy 304 (see, e.g., graphical objects 320, 330, 340, and 350 in dashed lines in FIG. 3G). This may allow for a user to distinguish the relationship between the graphical object content of original tile 304 and the graphical object content of mirrored copy 306.

Once suitable superimposed mirrored original tile graphical object content 263 has been generated by mirror overlaying module 262, mirror overlaying module 262 may provide superimposed mirrored original tile graphical object content 263 to mirror erasing module 264 for erasing a portion of the graphical object content of the superimposed mirrored copy 306 of superimposed mirrored tile 308 while maintaining the remaining portion of the graphical object content of the superimposed mirrored copy 306 of superimposed mirrored tile 308 as well as maintaining all of the graphical object content of original tile 304 of superimposed mirrored tile 308. For example, mirror erasing module 264 of graphical object manipulating module 230 may be configured to receive superimposed mirrored original tile graphical object content 263 and to generate partially-erased superimposed mirrored original tile graphical object content 265.

As mentioned, mirror erasing module 264 may be configured to determine which portion of the superimposed mirrored copy of the original tile to erase based on any suitable information, such as the orientation content of oriented original tile graphical object content 229, the graphical object content of oriented original tile graphical object content 229, and/or graphical object manipulation information 231 provided by a user or an application of device 100. For example, the portion of the superimposed mirrored copy to be erased by mirror erasing module 264 may be the portion outside of a threshold distance or range of at least a portion of a side of the original tile identified by the orientation content of oriented original tile graphical object content 229 (e.g., the graphical object content of the superimposed mirrored copy that is not within a threshold distance or range of at least a portion of right side 307 of original tile 304, and thus not within a threshold distance or range of at least a portion of mirrored right side 307*m* of mirrored copy 306). Additionally or alternatively, the portion of the superimposed mirrored copy to be erased by mirror erasing module 264 may be determined based on the graphical object content of the original tile (e.g., graphical objects 320, 330, 340, and 350 of original tile 304), the graphical object content of the mirrored copy (e.g., graphical objects 320*m*, 330*m*, 340*m*, and 350*m* of mirrored copy 306), and/or the relationship between the graphical object content of the original tile and the graphical object content of the mirrored copy when superimposed on the graphical object content of the original tile (e.g., the relationship between graphical objects 320, 320*m*, 330, 330*m*, 340, 340*m*, 350, and/or 350*m* of superimposed mirrored tile 308).

System 201 may be configured such that menu 310 may provide a user with one or more ways in which he or she can choose which portion or portions of the graphical object content of the superimposed mirrored copy 306 of superimposed mirrored tile 308 to erase. A selection tool 380 may be presented to and moved by a user on screen 300*g* such that tool 380 may be positioned over any suitable portion or portions of the graphical object content of superimposed mirrored copy 306 of superimposed mirrored tile 308 to be erased. For example, as shown in FIG. 3G, selection tool 380 may be positioned over the portion of the graphical object content of superimposed mirrored copy 306 of superimposed mirrored tile 308 that is not within a threshold distance d of identified right side 307. The amount of superimposed mirrored copy 306 that may be maintained or not selected by tool 380 may depend on the intricacy of the graphical object content or texture of original tile 304. A medium detailed original tile may have a smaller portion of the mirrored copy maintained, while a fairly simple original tile may maintain a large portion of the mirrored copy, and while a heavily textured or complicated original tile may maintain a medium sized portion of the mirrored copy. As shown in FIG. 3G, the portion of mirrored copy 306 that may not be erased by tool 380 may be based on the content of mirrored copy 306 (e.g., distance d may be such that all of mirrored graphical object content 330m may be maintained and not erased by tool 380).

As shown by screen 300h of FIG. 3H, for example, mirror erasing module 264 may generate partially-erased superimposed mirrored original tile graphical object content 265. Then mirror erasing module 264 may pass this partially-erased superimposed mirrored original tile graphical object content 265 on to processing module 250 for processing and presentation on display 112 as processed partially-erased superimposed mirrored original tile graphical object content data, for example, such that a portion of the graphical object content of mirrored copy 306 of superimposed mirrored tile 308 may be erased to provide a now partially-erased superimposed mirrored tile 308e that may be generated and presented on canvas 301. As shown in FIG. 3H, partially-erased superimposed mirrored tile 308e may include all of original tile 304 of superimposed mirrored tile 308 as well as a partially-erased mirrored copy 306e. Partially-erased mirrored copy 306e of partially-erased superimposed mirrored tile 308e of FIG. 3H may be the portion of mirrored copy 306 of superimposed mirrored tile 308 of FIG. 3G that was not erased (e.g., the graphical object content of mirrored copy 306 of superimposed mirrored tile 308 not covered by selection tool 380 in FIG. 3G). As shown in FIG. 3H, for example, partially-erased mirrored copy 306e of partially-erased superimposed mirrored tile 308e may include a portion of mirrored graphical object 320m (e.g., partially-erased mirrored copy graphical object 320me) and all of mirrored graphical object 330m (e.g., partially-erased mirrored copy graphical object 330me).

Once suitable partially-erased superimposed mirrored original tile graphical object content 265 has been generated by mirror erasing module 264, mirror erasing module 264 may provide partially-erased superimposed mirrored original tile graphical object content 265 to blending module 266 for blending at least a portion of the graphical object content of original tile 304 of partially-erased superimposed mirrored tile 308e with at least some of the graphical object content of partially-erased mirrored copy 306e of partially-erased superimposed mirrored tile 308e. For example, blending module 266 of graphical object manipulating module 230 may be configured to receive partially-erased superimposed mirrored original tile graphical object content 265 and to generate blended partially-erased superimposed mirrored original tile graphical object content 267.

As mentioned, blending module 266 may be configured to determine which portion of the graphical object content of the original tile and which portion of the graphical object content of the partially-erased superimposed mirrored copy of the original tile are to be blended together, as well as what blending techniques to use, based on any suitable information. For example, all the graphical object content of the partially-erased superimposed mirrored copy may be blended with the portion of the graphical object content of the original tile within the same threshold distance d that was used to erase a portion of the superimposed mirrored copy (see, e.g., FIG. 3G). In other embodiments, some of the graphical object content of the partially-erased superimposed mirrored copy may be completely erased and/or some of the graphical object content of the partially-erased superimposed mirrored copy may not be blended at all but may be maintained to be the same as it is in the mirrored copy.

System 201 may be configured such that menu 310 may provide a user with one or more ways in which he or she can blend a specific portion of the graphical object content of original tile 304 of partially-erased superimposed mirrored tile 308e with a specific portion of the graphical object content of partially-erased mirrored copy 306e of partially-erased superimposed mirrored tile 308e. For example, as shown in FIG. 3H, a blending tool 390 may be presented to and moved by a user on screen 300h such that blending tool 390 may be manipulated over specific portions of the graphical object content of partially-erased superimposed mirrored tile 308e. For example, in some embodiments, blending tool 390 may be manipulated over all of the graphical object content of partially-erased mirrored copy 306e of partially-erased superimposed mirrored tile 308e as well as over the portion of graphical object content of original tile 304 of partially-erased superimposed mirrored tile 308e that is within threshold distance d of identified right side 307, as shown in FIG. 3H.

In some embodiments, blending tool 390 may be configured to make the graphical object content of partially-erased mirrored copy 306e more translucent the closer it is to identified right side 307 and more opaque the farther it is from identified right side 307. In other embodiments, blending tool 390 may be utilized differently at different portions of the graphical object content of partially-erased mirrored copy 306e and/or at different portions of original tile 304 of partially-erased superimposed mirrored tile 308e. For example, the portions of partially-erased mirrored copy 306e to be erased, blended, or maintained may depend on the graphical object content of original tile 304 and/or the graphical object content of partially-erased mirrored copy 306e. A user may examine partially-erased superimposed mirrored tile 308e to discover any artifacts of partially-erased mirrored copy 306e that may make a side of partially-erased superimposed mirrored tile 308e look obvious as a patterned tile when patterned across a layer of canvas 301. Alternatively or additionally, device 100 may be configured to analyze the contents of partially-erased superimposed mirrored tile 308e and detect such artifacts automatically.

For example, partially-erased mirrored copy graphical object 320me may be an artifact that may be inappropriate or cause side 303 and/or side 307 of partially-erased superimposed mirrored tile 308e to look obviously patterned if partially-erased superimposed mirrored tile 308e were patterned. As shown in FIG. 3H, blending tool 390 may be positioned at blending tool position 390a over partially-erased mirrored copy graphical object 320me of partially-erased superimposed mirrored tile 308e, and blending tool 390 at position 390a may erase all or at least a portion of partially-erased mirrored copy graphical object 320me. Similarly, blending tool 390 may be positioned at blending tool position 390b over the portion of graphical object 320 of original tile 304 that may be overlaid by partially-erased mirrored copy 306e of partially-erased superimposed mirrored tile 308e, and blending tool 390 at position 390b may erase all or at least a portion of partially-erased mirrored copy 306e so as to expose at least an additional portion or all of graphical object 320 of original tile 304. As also shown in FIG. 3H, blending tool 390 may be positioned at blending tool position 390c over an intersection of partially-erased mirrored copy graphical object 330me of partially-erased superimposed mirrored tile 308e and graphical object 340 of original tile 304, and blending tool 390 at position 390c may blend this content in one or more ways to produce graphical object content that may allow such a tile to be patterned with a less obvious boundary at right side 307. The content may be partially erased, smudged, or otherwise blended to create appropriate content of a tile to be patterned.

As shown by screen 300i of FIG. 3I, for example, blending module 266 may generate blended partially-erased superimposed mirrored original tile graphical object content 267. Then blending module 266 may pass this blended partially-erased superimposed mirrored original tile graphical object content 267 on to processing module 250 for processing and presentation on display 112 as processed blended partially-erased superimposed mirrored original tile graphical object content data, for example, such that a portion of the graphical object content of partially-erased mirrored copy 306e of partially-erased superimposed mirrored tile 308e may be blended with a portion of graphical object content of original tile 304 of partially-erased superimposed mirrored tile 308e to provide a now blended partially-erased superimposed mirrored tile 308b that may be generated and presented on canvas 301. As shown in FIG. 3I, blended partially-erased superimposed mirrored tile 308b may include the graphical object content of original tile 304 and the graphical object content of an at least partially-blended partially-erased mirrored copy 306b. For example, original tile 304 of blended partially-erased superimposed mirrored tile 308b may include unblended graphical object 320, unblended graphical object 330, unblended graphical object 350, an unblended portion of graphical object 340, and a blended portion 340b of graphical object 340. At least partially-blended partially-erased mirrored copy 306b of blended partially-erased superimposed mirrored tile 308b may include blended partially-erased mirrored graphical object portion 330meb. For example, the right side of the triangle drawing shape of graphical object 340 of original tile 304 may be completely obscured by an opaque portion of partially-blended partially-erased mirrored copy 306b, while the left side (e.g., the tip) of the triangle drawing shape of graphical object 340 of original tile 304 may be completely presented and not obscured by partially-blended partially-erased mirrored copy 306b, and while a middle portion of the triangle drawing shape of graphical object 340 of original tile 304 may be blended in some way with a portion of blended partially-erased mirrored graphical object portion 330meb of partially-blended partially-erased mirrored copy 306b.

Once suitable blended partially-erased superimposed mirrored original tile graphical object content 267 has been generated by blending module 266, blending module 266 may pass blended partially-erased superimposed mirrored original tile graphical object content 267 on to finalizing module 268. Finalizing module 268 may then finalize received graphical object content 267 as manipulated original tile graphical object content 239 for patterning blended partially-erased superimposed mirrored tile 308b. Alternatively, finalizing module 268 may pass received graphical object content 267 as partially-manipulated original tile graphical object content 269 on to mirror generating module 260 for additional manipulation of blended partially-erased superimposed mirrored tile 308b (e.g., based on the orientation content of oriented original tile graphical object content 229). For example, finalizing module 268 of graphical object manipulating module 230 may be configured to receive graphical object content 267 and to generate manipulated original tile graphical object content 239 or partially-manipulated original tile graphical object content 269.

As mentioned, finalizing module 268 may determine which type of content to generate based on the orientation content of oriented original tile graphical object content 229. For example, if the orientation content of oriented original tile graphical object content 229 only identified a single side of original tile 304 (e.g., only highlighted identification 361 of right side 307 of complete original tile 304 was generated), then finalizing module 268 may determine that blended partially-erased superimposed mirrored tile 308b has been sufficiently manipulated and that blended graphical object content 267 may be finalized and passed on to any other suitable component of graphical display system 201 as manipulated original tile graphical object content 239. However, if the orientation content of oriented original tile graphical object content 229 identified more than a single side of original tile 304 (e.g., both highlighted identification 361 of right side 307 and highlighted identification 362 of top side 303 were generated, as described above with respect to FIG. 3E), then finalizing module 268 may determine that blended partially-erased superimposed mirrored tile 308b has not been sufficiently manipulated and that blended graphical object content 267 may be passed on as partially-manipulated original tile graphical object content 269 to mirror generating module 260 for additional manipulation.

If finalizing module 268 does indeed determine that that blended partially-erased superimposed mirrored tile 308b has not been sufficiently manipulated and that blended graphical object content 267 may be passed on as partially-manipulated original tile graphical object content 269 to mirror generating module 260 for additional manipulation, the manipulation of original tile 304 described above with respect to FIGS. 3F-3I may be repeated for blended partially-erased superimposed mirrored tile 308b. However, instead of using highlighted identification 361 of right side 307 to mirror blended partially-erased superimposed mirrored tile 308b, mirror generating module 260 may be configured to mirror blended partially-erased superimposed mirrored tile 308b using highlighted identification 362 of top side 303.

As shown by screen 300j of FIG. 3J, for example, mirror generating module 260 may generate additional mirrored graphical object content 261 about a mirror axis along identified top side 303 of blended partially-erased superimposed mirrored tile 308b. Then mirror generating module 260 may pass this additional mirrored original tile graphical object content 261 on to processing module 250 for processing and presentation on display 112 as processed additional mirrored original tile graphical object content data, for example, such that a mirrored copy 308bm of blended partially-erased superimposed mirrored tile 308b may be generated about top side 303 and presented on canvas 301. Mirror axis MA may be presented and moved by a user on screen 300j such that it may positioned along identified top side 303 such that mirrored copy 308bm of blended partially-erased superimposed mirrored tile 308b may be generated and presented about top side 303 in the direction of arrow M2, as shown in FIG. 3J.

Next, although not shown, mirrored copy 308bm of blended partially-erased superimposed mirrored tile 308b may be superimposed on blended partially-erased superimposed mirrored tile 308b (e.g., just as mirrored copy 306 was superimposed on original tile 304 in FIG. 3G). Then, although not shown, a portion of mirrored copy 308bm of blended partially-erased superimposed mirrored tile 308b, as superimposed on blended partially-erased superimposed mirrored tile 308b, may be erased (e.g., just as a portion of mirrored copy 306 was erased in FIG. 3H). For example, a portion of the graphical object content of mirrored copy 308bm that is not within a threshold distance b of identified top side 303, as shown in FIG. 3J, may be erased. Next, although not shown, the remaining portion of mirrored copy 308bm of blended partially-erased superimposed mirrored tile 308b, as partially-erased and superimposed on blended partially-erased superimposed mirrored tile 308b, may be blended with a portion of blended partially-erased superimposed mirrored tile 308b (e.g., just as a portion of partially-erased mirrored copy 306e was blended with a portion of original tile 304 in FIG. 3I). Finally, blending module 266 may pass this resulting graphical object content as additionally blended partially-erased superimposed mirrored original tile graphical object content 267a on to finalizing module 268.

Once finalizing module 268 determines that its received graphical object content (i.e., either received graphical object content 267 or 267a) does not need to be manipulated any further, finalizing module 268 may then finalize its received graphical object content 267 or 267a as manipulated original tile graphical object content 239 for patterning blended partially-erased superimposed mirrored tile 308b of FIG. 3I or the tile that may result from appropriately overlaying, erasing, and blending tiles 308b and 308bm of FIG. 3J. Either one of those tiles that may be defined by manipulated original tile graphical object content 239 may be referred to herein as a finalized manipulated original tile 374. For example, as shown in FIG. 3K, finalized manipulated original tile 374 may be presented in screen 300k. As shown, finalized manipulated original tile 374 may include blended and unblended graphical object content of one or more various types of graphical objects 370 positioned within a finalized manipulated tile outline 372, and manipulated tile outline 372 may include a top side 373, a bottom side 375, a right side 377, and a left side 379.

At some point, once suitable manipulated original tile graphical object content 239 has been generated by finalizing module 268 of graphical object manipulating module 230, graphical object manipulating module 230 may provide finalized manipulated original tile graphical object content 239 to graphical object mapping module 240 for mapping the graphical object content of a finalized and manipulated original tile. For example, pinning module 242 of graphical object mapping module 240 may be configured to receive finalized manipulated original tile graphical object content 239 and to pin or otherwise position an initial copy of finalized manipulated tile 374 defined by manipulated original tile graphical object content 239 at a particular initial position on a layer of a virtual canvas.

As mentioned, pinning module 242 may be configured to pin the initial copy of a finalized manipulated tile at any suitable initial position on a layer of a virtual canvas. In some embodiments, the particular initial position at which the initial copy of the finalized manipulated tile may be pinned by pinning module 242 may be based on graphical object mapping information 241 provided by a user or an application of device 100. For example, when manipulated original tile graphical object content 239 is finalized and finalized manipulated original tile 374 is presented on canvas 301, as shown in FIG. 3K, menu 310 may reveal one or more sub-menus (not shown) that can provide the user with one or more ways in which he or she can define an initial position on layer 311 of canvas 301 that manipulated original tile 374 is to be pinned. For example, device 100 may be configured to allow a user to actively select and move manipulated original tile 374 of FIG. 3K to any desired position on layer 311 at which manipulated original tile 374 is to be pinned, using any suitable sub-menus provided by menu 310 and/or using any other suitable input gestures with any suitable input component 110 available to the user, such as a mouse input component or a touch input component (e.g., touch screen 111). Such menu selections and/or other input gestures made by the user may be received by pinning module 242 of graphical object mapping module 240 as graphical object mapping information 241 for defining an initial position at which manipulated original tile 374 is to be pinned on layer 311 of canvas 301 for eventual patterning.

Based on any appropriate graphical object mapping information 241, which may be generated by a user or any application running on device 100, pinning module 242 may be configured to identify an initial position on layer 311 of canvas 301 at which manipulated original tile 374 is to be pinned. For example, as shown in FIG. 3L, pinning module 342 may be configured to pin manipulated original tile 374 at an initial pinning position 374i. In some embodiments, as shown in FIG. 3L, initial pinning position 374i may align bottom side 375 of tile 374 with the bottom 311b of layer 311 and centered about center point 311bc of bottom 311b of layer 311 in screen 300l. In other embodiments, initial pinning position 374i may be any other suitable position other than the bottom center of layer 311, such as the upper-left corner 311ulc of layer 311 in screen 300l.

Once initial pinning position 374i has been identified, pinning module 242 may be configured to pass the manipulated original tile graphical object content 239 of the initial manipulated tile, along with the particular initial position at which the initial manipulated tile may be pinned, on to any other portion of graphical display system 201 as pinned initial manipulated original tile graphical object content 243. For example, pinning module 242 may generate pinned initial manipulated original tile graphical object content 243. This pinned initial manipulated original tile graphical object content 243 may then be processed by graphical object processing module 250 as processed graphical object data 259 (e.g., processed pinned initial manipulated original tile graphical object data) and presented on display 112.

Once suitable pinned initial manipulated original tile graphical object content 243 has been generated by pinning module 242, pinning module 242 may provide pinned initial manipulated original tile graphical object content 243 to patterning module 244 for patterning a copy of manipulated original tile 374 in one or more directions away from the initially pinned manipulated original tile 374 at initial pinning position 374i along layer 311 of virtual canvas 301. For example, patterning module 244 of graphical object mapping module 240 may be configured to receive pinned initial manipulated original tile graphical object content 243 and to pattern the initially pinned manipulated tile in one or more suitable directions along the layer of the virtual canvas.

As mentioned, patterning module 244 may be configured to pattern the initial copy of a finalized manipulated tile in any suitable direction or directions along a layer of a virtual canvas. In some embodiments, one or more such directions in which initially pinned manipulated original tile 374 may be patterned by patterning module 244 may be based on graphical object mapping information 241 provided by a user or an application of device 100. For example, a user may choose such a direction by dragging a copy of initially pinned manipulated original tile 374 away from initial pinning position 374i in a desired direction across layer 311.

Alternatively or additionally, an application of device 100 may determine at least one such direction based on any suitable criteria, such as the type or current settings of the application that may be provided with layer 311 as a background (e.g., Photo Booth™ by Apple Inc. or any other suitable application that may utilize layer 311 containing graphical object data provided by a pattern of multiple instances of a single manipulated tile of graphical object data). Alternatively or additionally, one or more directions in which a copy of initially pinned manipulated original tile 374 may be patterned by patterning module 244 may be based on the orientation content of oriented original tile graphical object content 229.

For example, as shown in FIG. 3E, orientation content of oriented original tile graphical object content 229 may be presented on canvas 301 of screen 300*e* as a first highlighted identification 361 of right side 307 of complete original tile 304, which may define a first horizontal direction in which original tile 304 may be patterned (e.g., the horizontal direction of arrow H of FIG. 3E). Patterning module 244 may be configured to determine this first horizontal direction of arrow H from oriented original tile graphical object content 229 and then pattern one or more copies of initially pinned manipulated original tile 374 in this first horizontal direction away from initial pinning position 374*i* across layer 311 of canvas 301, as shown in FIG. 3M. This patterning in the first horizontal direction of arrow H may position the left side of a copy of initially pinned manipulated original tile 374 (e.g., left side 379*c* of copied manipulated original tile 374*c*) adjacent to right side 377 of initially pinned manipulated original tile 374. Additional copies of initially pinned manipulated original tile 374 may likewise be positioned adjacent other copied manipulated original tiles 374*c* in the first horizontal direction of arrow H, as shown in FIG. 3M, such that screen 300*m* may only present a portion of one or more copied manipulated original tiles 374*c* (e.g., the right-most copied manipulated original tiles 374*c* of FIG. 3M may be cropped by layer 311 of screen 300*m*).

As also shown in FIG. 3E, orientation content of oriented original tile graphical object content 229 may be presented on canvas 301 of screen 300*e* as a second highlighted identification 362 of top side 303 of complete original tile 304, which may define a first vertical direction in which original tile 304 may be patterned (e.g., the vertical direction of arrow V of FIG. 3E). Patterning module 244 may be configured to determine this first vertical direction of arrow V from oriented original tile graphical object content 229 and then pattern one or more copies of initially pinned manipulated original tile 374 in this first vertical direction away from initial pinning position 374*i* across layer 311 of canvas 301, as shown in FIG. 3N. This patterning in the first vertical direction of arrow V may position the bottom side of a copy of initially pinned manipulated original tile 374 (e.g., bottom side 375*c* of a copied manipulated original tile 374*c*) adjacent to top side 373 of initially pinned manipulated original tile 374. Copies of initially pinned manipulated original tile 374 may likewise be positioned adjacent other copied manipulated original tiles 374*c* in the first vertical direction of arrow V, as shown in FIG. 3N, such that screen 300*n* may present a complete copy of the copied manipulated original tile 374*c* directly above initially pinned manipulated original tile 374.

As shown in FIG. 3O, this patterning in the first horizontal direction of arrow H and this patterning in the first vertical direction of arrow V may be repeated away from each copied manipulated original tile 374*c*, such that the portion of layer 311 above and to the right of initially pinned manipulated original tile 374 in screen 300*o* may be patterned with a copied manipulated original tile 374*c*. Moreover, in some embodiments, as also shown in FIG. 3O, this patterning may also be repeated in directions opposite to the first horizontal direction of arrow H and the first vertical direction of arrow V. For example, this patterning may also be performed in a second horizontal direction of arrow H' that may be opposite to that of arrow H along layer 311 and/or in a second vertical direction of arrow V' that may be opposite to that of arrow V along layer 311.

Therefore, a copied manipulated original tile 374*c* may be patterned away from initially pinned manipulated original tile 374 in any suitable direction (e.g., each direction identified by the orientation content of oriented original tile graphical object content 229 and/or any direction opposite to each one of such directions). The patterning of copied manipulated original tile 374*c* may fill layer 311, and layer 311 may be utilized by any suitable application. Copied manipulated original tile 374*c* may be patterned additional times depending on the aspect ratio or size of the screen to be displaying the patterned tiles, which may be different than screen 300*o* of layer 311 of FIG. 3O.

Figure 4:
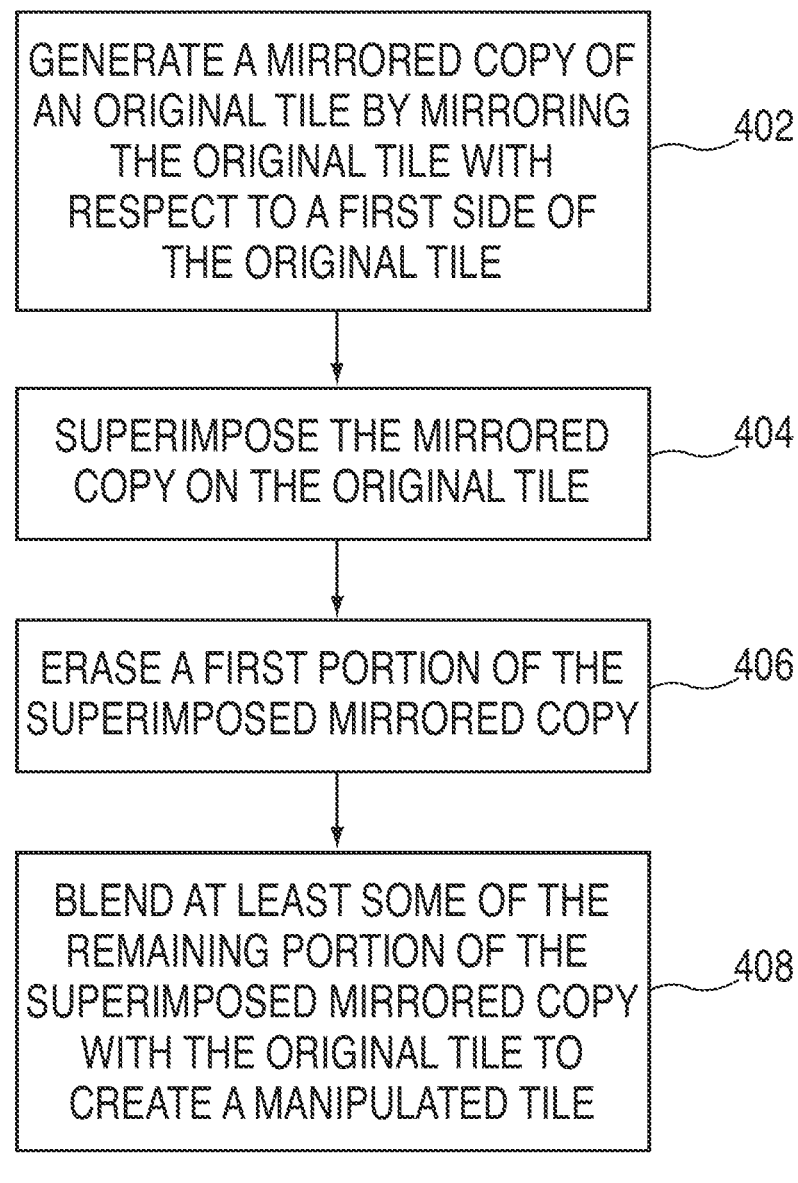
FIG. 4 is a flowchart of an illustrative process for manipulating and mapping tiles of graphical object data, in accordance with some embodiments of the invention.

FIG. 4 is a flowchart of an illustrative process 400 for manipulating an original tile of graphical data. Process 400 may begin at step 402 by generating a mirrored copy of the original tile by mirroring the original tile with respect to a first side of the original tile. For example, a graphical display system, such as system 201 of FIG. 2, may be configured to access an original tile of graphical data (e.g., as generated from module 210 and/or received from component 124). System 201 may be configured to mirror such a tile with module 260. Next, at step 404, process 400 may superimpose the mirrored copy on the original tile (e.g., as described with respect to module 262 of system 201). Next, at step 406, process 400 may erase a first portion of the superimposed mirrored copy (e.g., as described with respect to module 264 of system 201). Then, at step 408, process 400 may blend at least some of the remaining portion of the superimposed mirrored copy with the original tile to create a manipulated tile (e.g., as described with respect to module 266 of system 201).

In some embodiments, the first portion of the superimposed mirrored copy may include a portion of the superimposed mirrored copy that is not within a threshold distance of the first side of the original tile. In some embodiments, the blending of step 408 may include altering the opaqueness of at least some of the remaining portion of the superimposed mirrored copy. In some embodiments, process 400 may also include pinning the manipulated tile to the bottom center of a layer of a canvas. Next, process 400 may include patterning a copy of the manipulated tile adjacent the first side of the pinned manipulated tile and/or patterning a copy of the manipulated tile away from the pinned manipulated tile in a first direction that is perpendicular to the first side.

In some embodiments, process 400 may also include generating a mirrored copy of the manipulated tile by mirroring the manipulated tile with respect to a second side of the manipulated tile, superimposing the mirrored copy of the manipulated tile on the manipulated tile, erasing a first portion of the superimposed mirrored copy of the manipulated tile, and blending at least some of the remaining portion of the superimposed mirrored copy of the manipulated tile with the manipulated tile to create an additionally manipulated tile. For example, the first portion of the superimposed mirrored copy of the manipulated tile may be a portion of the superimposed mirrored copy of the manipulated tile that is not within a threshold distance of the second side of the manipulated tile. Process 400 may include blending at least some of the remaining portion of the superimposed mirrored copy of the manipulated tile by altering the opaqueness of at least some of the remaining portion of the superimposed mirrored copy of the manipulated tile. Then, process 400 may also include pinning the additionally manipulated tile to the bottom center of a layer of a canvas. In some embodiments, process 400 may also include patterning a copy of the additionally manipulated tile adjacent the first side of the pinned additionally manipulated tile and/or patterning a copy of the additionally manipulated tile away from the pinned additionally manipulated tile in a first direction that is perpendicular to the second side.

It is to be understood that the steps shown in process 400 of FIG. 4 is merely illustrative and that existing steps may be modified or omitted, additional steps may be added, and the order of certain steps may be altered. For example, in some embodiments, at least one portion of the superimposed mirrored copy of the original tile may be blended with the original tile before another portion of the superimposed mirrored copy of the original tile may be erased.

Moreover, the processes described with respect to FIGS. 1-4, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol (e.g., the computer-readable medium may be communicated to electronic device 100 via communications circuitry 106). The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that each module of graphical display system 201 may be provided as a software construct, firmware construct, one or more hardware components, or a combination thereof. For example, graphical display system 201 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of graphical display system 201 are merely illustrative, and that the number, configuration, functionality, and interconnection of existing modules may be modified or omitted, additional modules may be added, and the interconnection of certain modules may be altered.

At least a portion of one or more of the modules of system 201 may be stored in or otherwise accessible to device 100 in any suitable manner (e.g., in memory 104 of device 100 or via communications circuitry 106 of device 100). Each module of system 201 may be implemented using any suitable technologies (e.g., as one or more integrated circuit devices), and different modules may or may not be identical in structure, capabilities, and operation. Any or all of the modules or other components of system 201 may be mounted on an expansion card, mounted directly on a system motherboard, or integrated into a system chipset component (e.g., into a "north bridge" chip). System 201 may include any amount of dedicated graphics memory, may include no dedicated graphics memory and may rely on device memory 104 of device 100, or may use any combination thereof.

Graphical display system 201 may be a dedicated system implemented using one or more expansion cards adapted for various bus standards. For example, all of the modules may be mounted on different interconnected expansion cards or all of the modules may be mounted on one expansion card. The modules of system 201 may interface with a motherboard or processor 102 of device 100 through an expansion slot (e.g., a peripheral component interconnect ("PCI") slot or a PCI express slot). Alternatively, system 201 need not be removable but may include one or more dedicated modules that may include memory (e.g., RAM) dedicated to the utilization of the module. In other embodiments, system 201 may be a graphics system integrated into device 100. For example, a module of system 201 may utilize a portion of device memory 104 of device 100. One or more of the modules of graphical display system 201 may include its own processing circuitry and/or memory. Alternatively each module of graphical display system 201 may share processing circuitry and/or memory with any other module of graphical display system 201 and/or processor 102 and/or memory 104 of device 100.

One or more Application Programming Interfaces ("APIs") may be used in some embodiments (e.g., with respect to graphical object manipulating module 230 or any other suitable module or any other suitable portion of any suitable module of graphical display system 201 of FIG. 2). An API may be an interface implemented by a program code component or hardware component (hereinafter "API-implementing component") that may allow a different program code component or hardware component (hereinafter "API-calling component") to access and use one or more functions, methods, procedures, data structures, classes, and/or other services provided by the API-implementing component. An API can define one or more parameters that may be passed between the API-calling component and the API-implementing component.

An API may allow a developer of an API-calling component, which may be a third party developer, to leverage specified features provided by an API-implementing component. There may be one API-calling component or there may be more than one such component. An API can be a source code interface that a computer system or program library may provide in order to support requests for services from an application. An operating system ("OS") can have multiple APIs to allow applications running on the OS to call one or more of those APIs, and a service (e.g., a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (e.g., not exposed) and can provide a subset of the first set of functions and can also provide another set of functions, such as testing or debugging functions which are not in the first set of functions. In other embodiments, the API-implementing component may itself call one or more other components via an underlying API and may thus be both an API-calling component and an API-implementing component.

An API may define the language and parameters that API-calling components may use when accessing and using specified features of the API-implementing component. For example, an API-calling component may access the specified features of the API-implementing component through one or more API calls or invocations (e.g., embodied by function or method calls) exposed by the API and may pass data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls may be transferred via the one or more application programming interfaces between the calling component (e.g., API-calling component) and an API-implementing component. Transferring the API calls may include issuing, initiating, invoking, calling, receiving, returning, or responding to the function calls or messages. Thus, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list, or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module. It should be understood that the API-implementing component and the API-calling component may be the same or different type of module from each other. API-implementing components may in some cases be embodied at least in part in firmware, microcode, or other hardware logic. In some embodiments, an API may allow a client program to use the services provided by a Software Development Kit ("SDK") library. In other embodiments, an application or other client program may use an API provided by an Application Framework. In such embodiments, the application or client program may incorporate calls to functions or methods provided by the SDK and provided by the API or may use data types or objects defined in the SDK and provided by the API. An Application Framework may, in these embodiments, provide a main event loop for a program that responds to various events defined by the Framework. The API may allow the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, and the like, and the API may be implemented in part by firmware, microcode, or other low level logic that may execute in part on the hardware component.

The API-calling component may be a local component (i.e., on the same data processing system as the API-implementing component) or a remote component (i.e., on a different data processing system from the API-implementing component) that may communicate with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that may be exposed to a different API-calling component.

The API may allow multiple API-calling components written in different programming languages to communicate with the API-implementing component, such that the API may include features for translating calls and returns between the API-implementing component and the API-calling component. However, the API may be implemented in terms of a specific programming language. An API-calling component can, in some embodiments, call APIs from different providers, such as a set of APIs from an OS provider and another set of APIs from a plug-in provider and another set of APIs from another provider (e.g., the provider of a software library) or creator of the another set of APIs.

Figure 5:
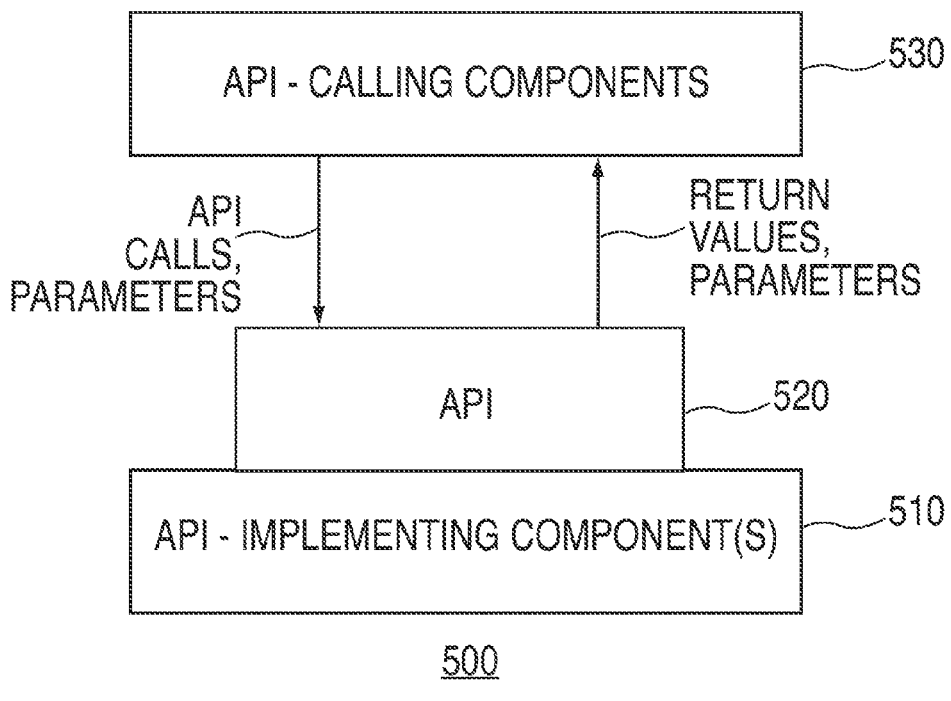
FIG. 5 is a block diagram of an illustrative application programming interface ("API") architecture, in accordance with some embodiments of the invention.

FIG. 5 is a block diagram illustrating an exemplary API architecture 500, which may be used in some embodiments of the invention. As shown in FIG. 5, the API architecture 500 may include an API-implementing component 510 (e.g., an operating system, a library, a device driver, an API, an application program, software, or other module) that may implements an API 520. API 520 may specify one or more functions, methods, classes, objects, protocols, data structures, formats, and/or other features of API-implementing component 510 that may be used by an API-calling component 530. API 520 can specify at least one calling convention that may specify how a function in API-implementing component 510 may receive parameters from API-calling component 530 and how the function may return a result to API-calling component 530. API-calling component 530 (e.g., an operating system, a library, a device driver, an API, an application program, software, or other module), may make API calls through API 520 to access and use the features of API-implementing component 510 that may be specified by API 520. API-implementing component 510 may return a value through API 520 to API-calling component 530 in response to an API call.

It is to be appreciated that API-implementing component 510 may include additional functions, methods, classes, data structures, and/or other features that may not be specified through API 520 and that may not be available to API-calling component 530. It is to be understood that API-calling component 530 may be on the same system as API-implementing component 510 or may be located remotely and may access API-implementing component 510 using API 520 over a network. While FIG. 5 illustrates a single API-calling component 530 interacting with API 520, it is to be understood that other API-calling components, which may be written in different languages than, or the same language as, API-calling component 530, may use API 520.

API-implementing component 510, API 520, and API-calling component 530 may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol (e.g., the computer-readable medium may be communicated to electronic device 100 via communications circuitry 106). The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Figure 6:
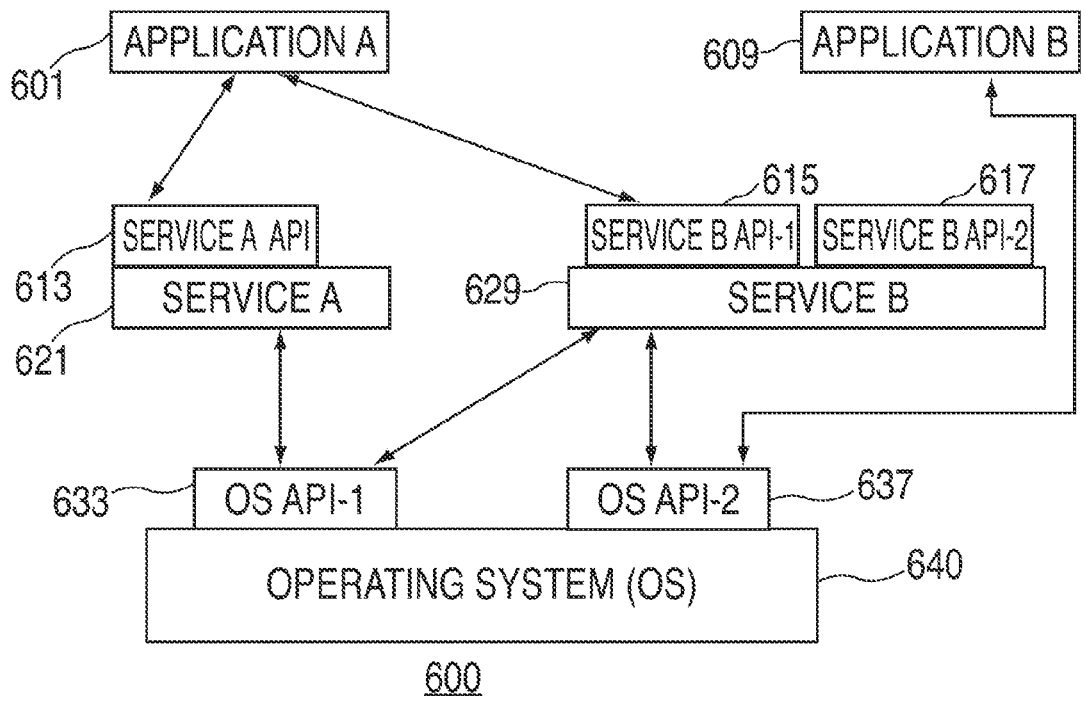
FIG. 6 is a block diagram of an illustrative API software stack, in accordance with some embodiments of the invention.

FIG. 6 is a block diagram illustrating an exemplary software stack 600, which may be used in some embodiments of the invention. As shown in FIG. 6, Application A 601 and Application B 609 can make calls to Service A 621 or Service B 629 using several Service APIs (e.g., Service APIs 613, 615, and 617) and to Operating System ("OS") 640 using several OS APIs (e.g., OS APIs 633 and 637). Service A 621 and Service B 629 can make calls to OS 640 using several OS APIs (e.g., OS APIs 633 and 637).

For example, as shown in FIG. 6, Service B 629 may include two APIs, one of which (i.e., Service B API-1 615) may receive calls from and return values to Application A 601 and the other of which (i.e., Service B API-2 617) may receive calls from and return values to Application B 609. Service A 621, which can be, for example, a software library, may make calls to and receive returned values from OS API-1 633, and Service B 629, which can be, for example, a software library, may make calls to and receive returned values from both OS API-1 633 and OS API-2 637. Application B 609 may make calls to and receive returned values from OS API-2 637.

While there have been described systems, methods, and computer-readable media for manipulating and/or mapping tiles of graphical object data, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms such as "up and "down," "top" and "bottom," "left" and "right," "length" and "width," "horizontal" and "vertical," and the like are used herein only for convenience, and that no fixed or absolute directional or orientational limitations are intended by the use of these words. For example, the devices of this invention can have any desired orientation. If reoriented, different directional or orientational terms may need to be used in their description, but that will not alter their fundamental nature as within the scope and spirit of this invention.

Therefore, those skilled in the art will appreciate that the invention can be practiced by other than the described embodiments, which are presented for purposes of illustration rather than of limitation.

What is claimed is:

1. A method of generating a manipulated tile of graphical data, the method comprising:
   generating, by a computer processor, a mirrored copy of an original tile of graphical data by mirroring the original tile with respect to a first side of the original tile;
   superimposing the mirrored copy on the original tile;
   erasing a first portion of the superimposed mirrored copy of the original tile while maintaining the original tile, the first portion of the superimposed mirrored copy of the original tile comprising a portion of the superimposed mirrored copy of the original tile that is not within a threshold distance of the first side of the original tile; and
   generating a manipulated tile of graphical data by blending at least some of a remaining portion of the superimposed mirrored copy of the original tile with the original tile.

2. The method of claim 1, wherein the blending comprises altering an opaqueness of at least some of the remaining portion of the superimposed mirrored copy of the original tile.

3. The method of claim 1, further comprising pinning the manipulated tile to a layer of a canvas.

4. The method of claim 3, further comprising patterning a copy of the manipulated tile adjacent a first side of the pinned manipulated tile.

5. The method of claim 3, further comprising patterning a copy of the manipulated tile away from the pinned manipulated tile in a first direction that is perpendicular to the first side.

6. The method of claim 1, further comprising pinning the manipulated tile to a bottom center of a layer of a canvas.

7. The method of claim 1, further comprising:
   generating a mirrored copy of the manipulated tile by mirroring the manipulated tile with respect to a second side of the manipulated tile;
   superimposing the mirrored copy of the manipulated tile on the manipulated tile;
   erasing a first portion of the superimposed mirrored copy of the manipulated tile; and
   generating an additionally manipulated tile by blending at least some of a remaining portion of the superimposed mirrored copy of the manipulated tile with the manipulated tile.

8. The method of claim 7, wherein the first portion of the superimposed mirrored copy of the manipulated tile comprises a portion of the superimposed mirrored copy of the manipulated tile that is not within a threshold distance of the second side of the manipulated tile.

9. The method of claim 7, wherein the blending at least some of the remaining portion of the superimposed mirrored copy of the manipulated tile comprises altering an opaqueness of at least some of the remaining portion of the superimposed mirrored copy of the manipulated tile.

10. The method of claim 7, further comprising pinning the additionally manipulated tile to a layer of a canvas.

11. The method of claim 10, further comprising patterning a copy of the additionally manipulated tile adjacent a first side of the pinned additionally manipulated tile.

12. The method of claim 10, further comprising patterning a copy of the additionally manipulated tile away from the pinned additionally manipulated tile in a first direction that is perpendicular to the second side.

13. The method of claim 7, further comprising pinning the additionally manipulated tile to a bottom center of a layer of a canvas.

14. One or more non-transitory computer-readable media comprising computer-readable code recorded thereon, which when executed by one or more processors, causes the one or more processors to:
  generate a mirrored copy of an original tile by mirroring the original tile with respect to a first side of the original tile, the original tile having graphical data;
  superimpose the mirrored copy of the original tile on the original tile;
  erase a first portion of the superimposed mirrored copy of the original tile while maintaining the original tile, the first portion of the superimposed mirrored copy of the original tile comprising a portion of the superimposed mirrored copy of the original tile that is not within a threshold distance of the first side of the original tile; and
  generate a manipulated tile by blending at least some of a remaining portion of the superimposed mirrored copy of the original tile with the original tile.

15. The one or more non-transitory computer-readable media of claim 14, further comprising additional computer-readable code recorded thereon, which when executed by the one or more processors, causes the one or more processors to:
  generate a mirrored copy of the manipulated tile by mirroring the manipulated tile with respect to a second side of the manipulated tile;
  superimpose the mirrored copy of the manipulated tile on the manipulated tile;
  erase a first portion of the superimposed mirrored copy of the manipulated tile; and
  generate an additionally manipulated tile by blending at least some of a remaining portion of the superimposed mirrored copy of the manipulated tile with the manipulated tile.

16. The one or more non-transitory computer-readable media of claim 15, further comprising additional computer-readable code recorded thereon, which when executed by the one or more processors, causes the one or more processors to:
  pin the additionally manipulated tile to a layer of a canvas; and
  pattern a copy of the additionally manipulated tile adjacent a first side of the pinned additionally manipulated tile.

17. A graphical display system comprising:
  a graphical object manipulating module configured to:
    generate a mirrored copy of an original tile by mirroring the original tile with respect to a first side of the original tile such that similar sides of the original tile and the mirrored copy are aligned;
    superimpose the mirrored copy of the original tile on the original tile;
    erase a first portion of the superimposed mirrored copy of the original tile while maintaining the original tile, the first portion of the superimposed mirrored copy of the original tile comprising a portion of the superimposed mirrored copy of the original tile that is not within a threshold distance of the first side of the original tile; and
    generate a manipulated tile by blending at least some of a remaining portion of the superimposed mirrored copy of the original tile with the original tile.

18. The graphical display system of claim 17, wherein the graphical object mapping module is further configured to:
  pin the manipulated tile to a layer of a canvas; and
  pattern a copy of the manipulated tile adjacent a first side of the pinned manipulated tile.

19. The graphical display system of claim 17, wherein the graphical object manipulating module is further configured to:
  generate a mirrored copy of the manipulated tile by mirroring the manipulated tile with respect to a second side of the manipulated tile;
  superimpose the mirrored copy of the manipulated tile on the manipulated tile;
  erase a first portion of the superimposed mirrored copy of the manipulated tile; and
  generate an additionally manipulated tile by blending at least some of a remaining portion of the superimposed mirrored copy of the manipulated tile with the manipulated tile.

* * * * *